(12) United States Patent
Hasuda et al.

(10) Patent No.: US 8,770,868 B1
(45) Date of Patent: Jul. 8, 2014

(54) CAMERA ACCESSORY

(71) Applicant: Nikon Corporation, Tokyo (JP)

(72) Inventors: Masanori Hasuda, Fujisawa (JP);
Hideaki Hoshikawa, Koshigaya (JP);
Noriyasu Kotani, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/204,473

(22) Filed: Mar. 11, 2014

Related U.S. Application Data

(63) Continuation of application No. PCT/JP2012/072628, filed on Sep. 5, 2012.

(30) Foreign Application Priority Data

Sep. 12, 2011 (JP) .................................. 2011-198420
Oct. 7, 2011 (JP) .................................. 2011-223138

(51) Int. Cl.
*G03B 17/14* (2006.01)
(52) U.S. Cl.
USPC .......................................................... 396/531
(58) Field of Classification Search
USPC .......................................... 396/531; 359/828
See application file for complete search history.

(56) References Cited

U.S. PATENT DOCUMENTS

| | | | | |
|---|---|---|---|---|
| 3,758,198 | A | * | 9/1973 | Kanie et al. ................... 359/828 |
| 4,302,077 | A | * | 11/1981 | Sato et al. ..................... 359/828 |
| 4,478,492 | A | * | 10/1984 | Ando ............................. 359/828 |
| 5,262,899 | A | | 11/1993 | Iizuka |
| 8,430,582 | B2 | * | 4/2013 | Hasuda et al. ................ 396/531 |
| 8,573,868 | B2 | * | 11/2013 | Hasuda et al. ................ 396/531 |

FOREIGN PATENT DOCUMENTS

| | | |
|---|---|---|
| JP | A-03-229229 | 10/1991 |
| JP | A-04-060624 | 2/1992 |
| JP | A-05-127242 | 5/1993 |
| JP | A-2008-033044 | 2/2008 |
| JP | A-2012-078783 | 4/2012 |

OTHER PUBLICATIONS

Dec. 4, 2012 International Search Report issued in International Application No. PCT/2012/072628.

* cited by examiner

*Primary Examiner* — W B Perkey
(74) *Attorney, Agent, or Firm* — Oliff PLC

(57) ABSTRACT

An accessory side mount of the camera accessory includes at least a first limiting portion and a second limiting portion that is different from the first limiting portion. When the first through third claws are rotated in a first rotational direction along the circumferential direction in order to install the accessory side mount that has been inserted in the proper installation and detachment rotational phase into the body side mount, the first limiting portion limits a range of rotation in the first rotational direction by abutting an end surface of one of the camera body side claws. When the first through third claws are rotated in a second rotational direction along the circumferential direction that is opposite to the first rotational direction in order to detach the accessory side mount from the body side mount, the second limiting portion limits a range of rotation in the second rotational direction by abutting an end surface of one of the camera body side claws.

3 Claims, 24 Drawing Sheets

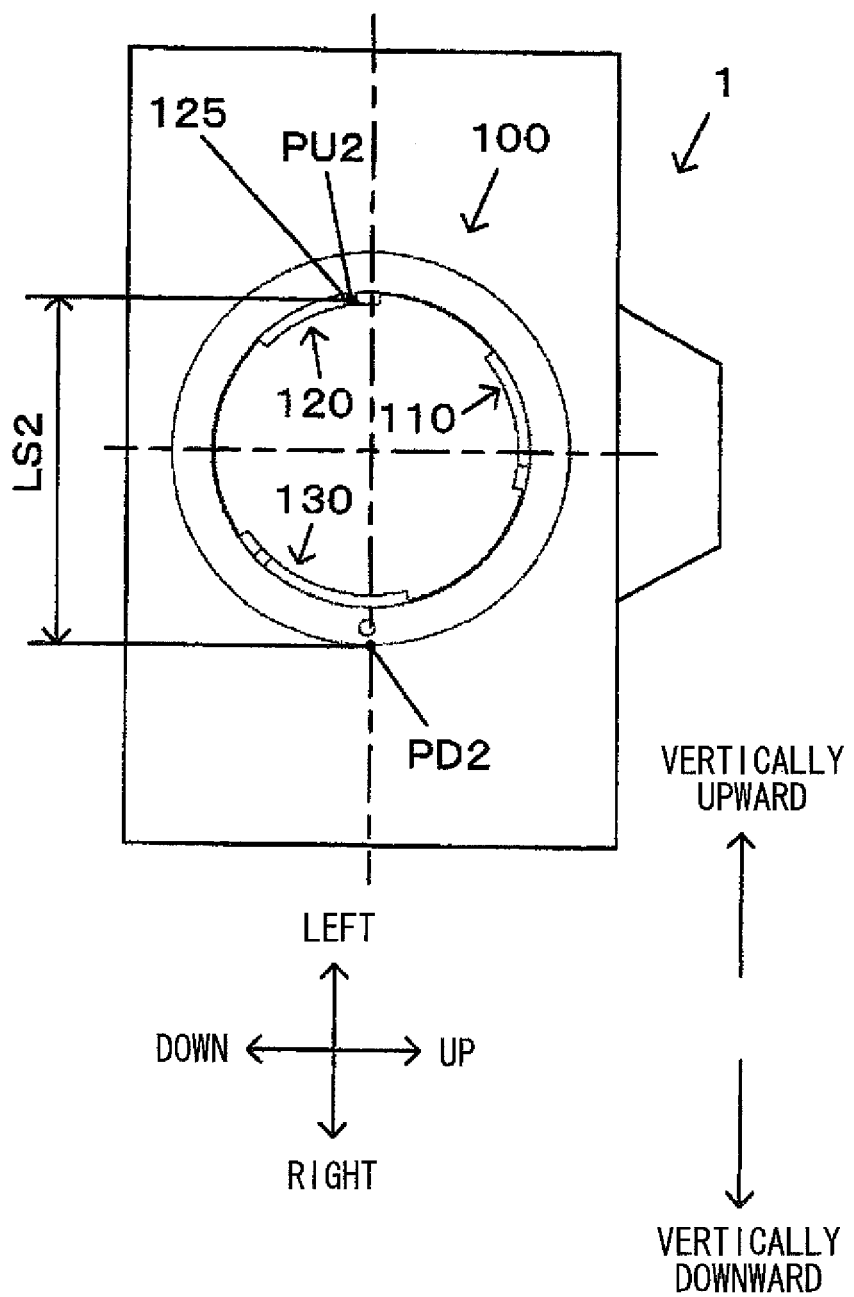

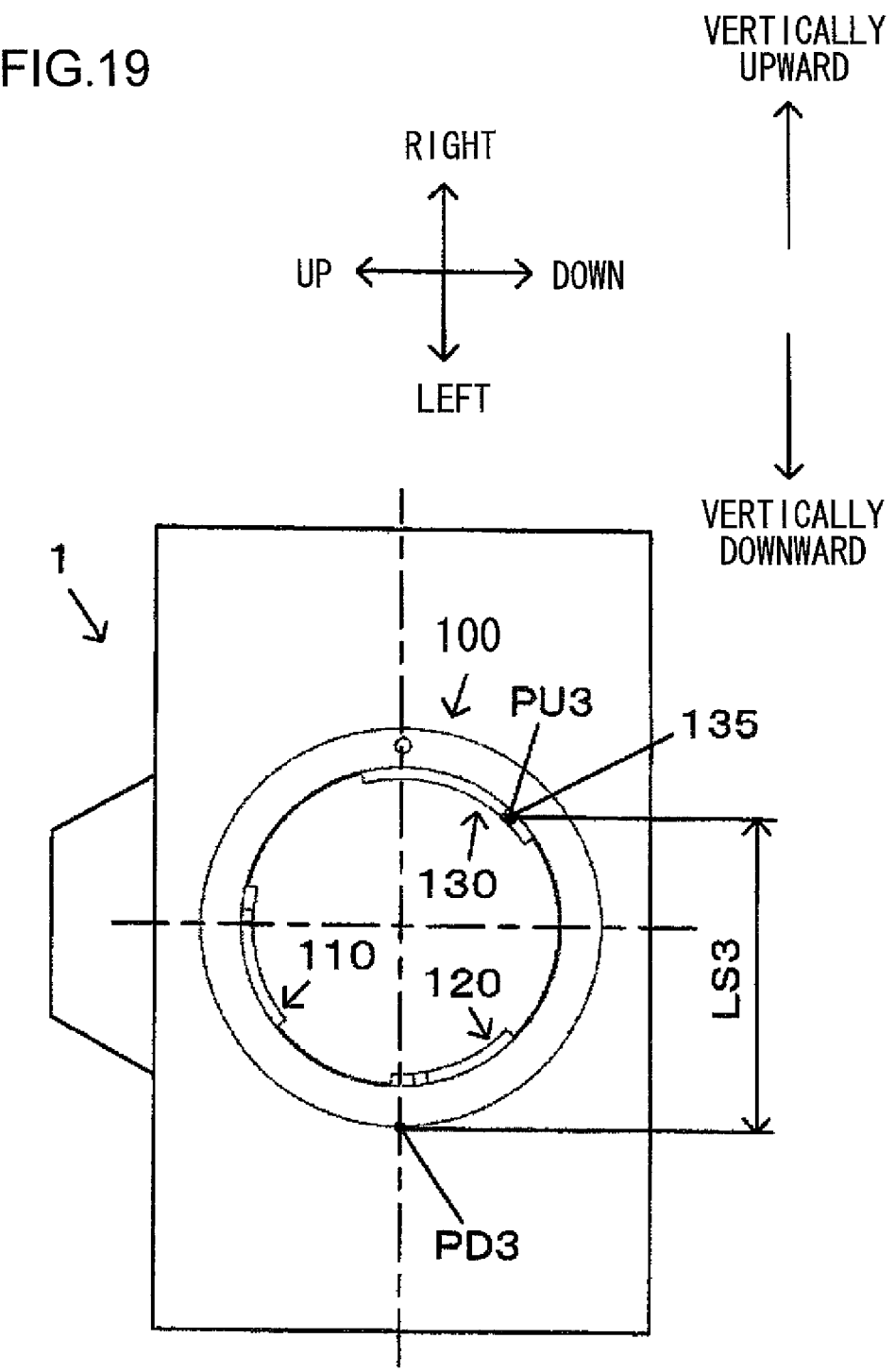

FRONT ←——→ REAR

CAMERA ACCESSORY

This application is a continuation of International Application No. PCT/JP2012/072628 filed Sep. 5, 2012. The disclosures of the following priority applications are herein incorporated by reference:
Japanese Patent Application No. 2011-198420 filed on Sep. 12, 2011
Japanese Patent Application No. 2011-223138 filed on Oct. 7, 2011
International Application No. PCT/JP2012/072628 filed on Sep. 5, 2012

BACKGROUND OF THE INVENTION

1. Field of the Invention

The present invention relates to a camera accessory that can be detachably fitted to a camera body that is provided with a camera body side mount.

2. Description of Related Art

A camera accessory and a camera body are per se known that employ a mounting system having a bayonet construction, and in which a camera accessory such as an interchangeable lens or the like and a camera body can be detachably fitted together. With this type of camera accessory and camera body, the camera accessory and the camera body are coupled together by inserting a mount of the camera accessory into a mount of the camera body in a rotational phase that is appropriate for installation and detachment, and by then rotating the camera accessory in a predetermined direction (i.e. in the installation direction) around its incident optical axis. Moreover, when the camera accessory has been coupled to the camera body, it can be detached from the camera body by rotating it in the opposite rotational direction from the installation direction (i.e. in the detachment direction), and by then pulling the camera accessory forward away from the camera body.

Japanese Laid Open Patent Publication No. H5-127242 discloses that with a camera accessory and a camera body having this type of structure, during both installation and detachment of the camera accessory, the range of rotation of the camera accessory in the installation direction and in the detachment direction is limited by a projecting portion that is provided upon the camera accessory abutting against an end surface of a claw of the camera body mount.

SUMMARY OF THE INVENTION

However, with the device described in the above publication, since the portion that limits the range of rotation (i.e. the limiting portion) is disposed only at a single location, accordingly it experiences shock due to collision with one of the mounting claws of the camera body, both during fitting of the camera accessory and also during detachment thereof. Due to this, there is a risk that a negative influence may be exerted upon the durability of this limiting portion.

A camera accessory, according to a first aspect of the present invention, that is detachably fitted to a camera body including a camera body side mount, and that comprises an accessory side mount having a bayonet construction with first through third claws that are mutually separated around a circumferential direction along a circumference a circle with a predetermined diameter and that project in a radial direction from the circumference; wherein: when the accessory side mount has been inserted into the camera body side mount in a proper installation and detachment rotational phase, each of the first through third claws is permitted to be inserted into the camera body side mount without being hampered by three camera body side claws that are provided to the camera body side mount; the accessory side mount comprises at least a first limiting portion and a second limiting portion that is different from the first limiting portion; when the first through third claws are rotated in a first rotational direction along the circumferential direction in order to install the accessory side mount that has been inserted in the proper installation and detachment rotational phase into the body side mount, the first limiting portion limits a range of rotation in the first rotational direction by abutting an end surface of one of the camera body side claws; and when the first through third claws are rotated in a second rotational direction along the circumferential direction that is opposite to the first rotational direction in order to detach the accessory side mount from the body side mount, the second limiting portion limits a range of rotation in the second rotational direction by abutting an end surface of one of the camera body side claws.

According to a second aspect of the present invention, in the camera accessory according to the first aspect, it is preferable that the first limiting portion and the second limiting portion are provided in front of one of the first through third claws.

According to a third aspect of the present invention, in the camera accessory according to the first aspect, the first limiting portion may be provided in front of one of the first through third claws; and the second limiting portion may be provided in front of any one of two claws, among the first through third claws, other than the one where the first limiting portion is provided.

BRIEF DESCRIPTION OF THE DRAWINGS

FIG. 18 is a figure for explanation of the contact points PD and PU and the distance LS, when the attitude of the camera body is one vertical position;

FIG. 19 is another figure for explanation of the contact points PD and PU and the distance LS, when the attitude of the camera body is another vertical position;

DESCRIPTION OF PREFERRED EMBODIMENTS

Figure 1:
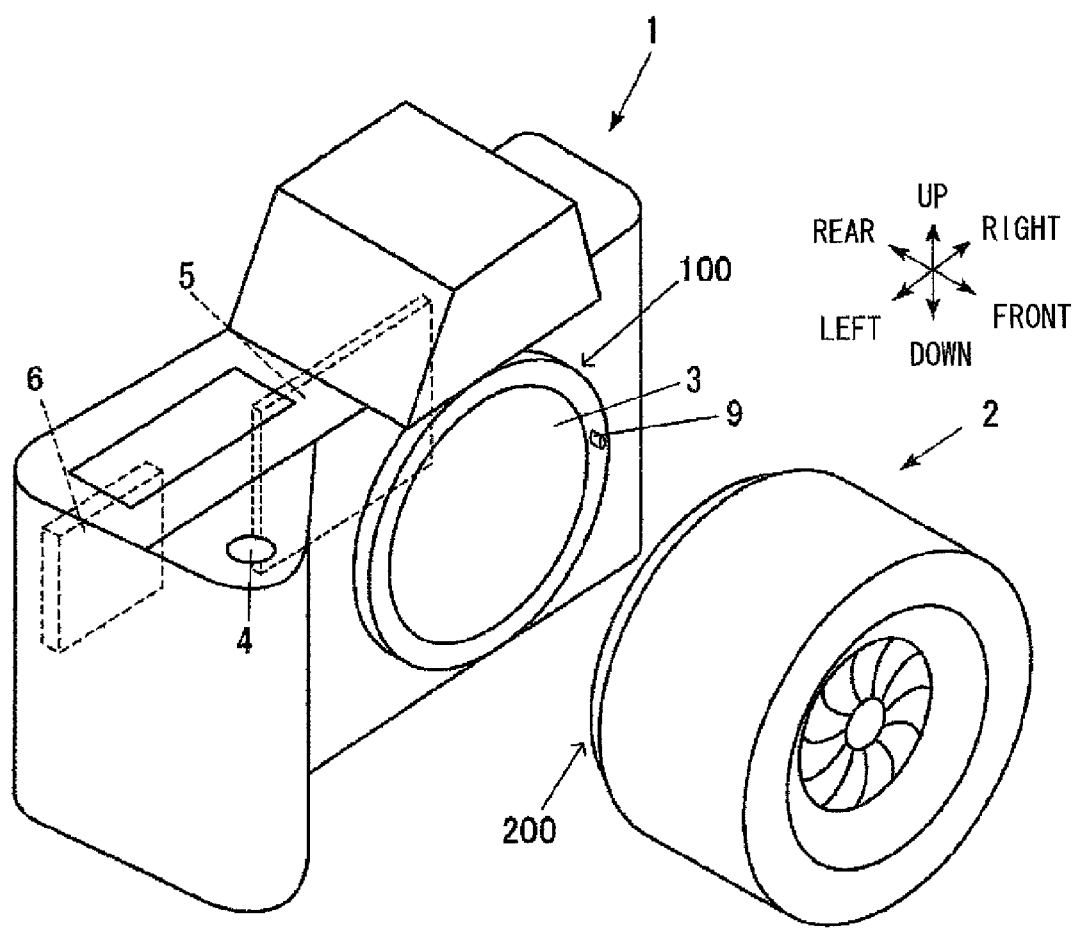
FIG. 1 is a perspective view schematically showing a camera body of an interchangeable lens type to which an embodiment of the present invention has been applied, and a photographic lens that can be fitted to the camera body in a detachable manner.

An embodiment of the camera accessory according to the present invention will now be described with reference to FIGS. 1 through 19. In this embodiment, an interchangeable lens (i.e. a photographic lens) that is installed to the camera body will be explained as an example of a camera accessory. FIG. 1 is a perspective view schematically showing a photographic lens 2 to which an embodiment of the present invention is applied, and a camera body 1 of an interchangeable lens type to which this photographic lens 2 can be detachably fitted. A release button 4, an imaging element 5, and a control circuit 6 that controls various sections of the camera body 1 are provided to the camera body 1. The reference symbol 3 denotes a photographic optical path for conducting an image of a photographic subject from the photographic lens 2 to the imaging element 5. And the reference symbol 9 denotes a lens install/detach lock pin for fixing the photographic lens 2 with respect to the camera body 1 when its installation has been completed, so that it cannot rotate.

A body side mount 100 having a bayonet construction is provided to the front of the camera body 1 for installation, not only of the photographic lens 2, but also of, for example, a camera accessory such as a converter lens or the like for changing the focal length. And an accessory side mount 200 is provided at the rear portion of the photographic lens 2 for installing the photographic lens 2 to the body side mount 100 in a detachable manner. It should be understood that the detailed shapes of the body side mount 100 and the accessory side mount 200 are not shown in FIG. 1. Moreover, in this embodiment, it is supposed that the front side of the camera body where the photographic lens 2 is attached (i.e. the side where the photographic subject is located) is oriented towards the front, while the rear side of the camera body 1 where the imaging element 5 is provided is oriented towards the back. Furthermore, the upward, downward, leftward, and rightward directions of the camera body 1 are determined as shown in FIG. 1. In FIG. 1, the upward and downward direction of the camera body 1 coincides with the vertical direction. The orientation of the camera body 1 when the camera body 1 is set up as shown in FIG. 1 will be termed its "normal orientation" or its "horizontal position". Moreover, the orientations of the camera body 1 when, from its horizontal position, the camera body 1 is rotated through 90° in the clockwise direction or in the anticlockwise direction as viewed from the front will be termed its "vertical positions".

—The Body Side Mount 100—

Figure 2A:
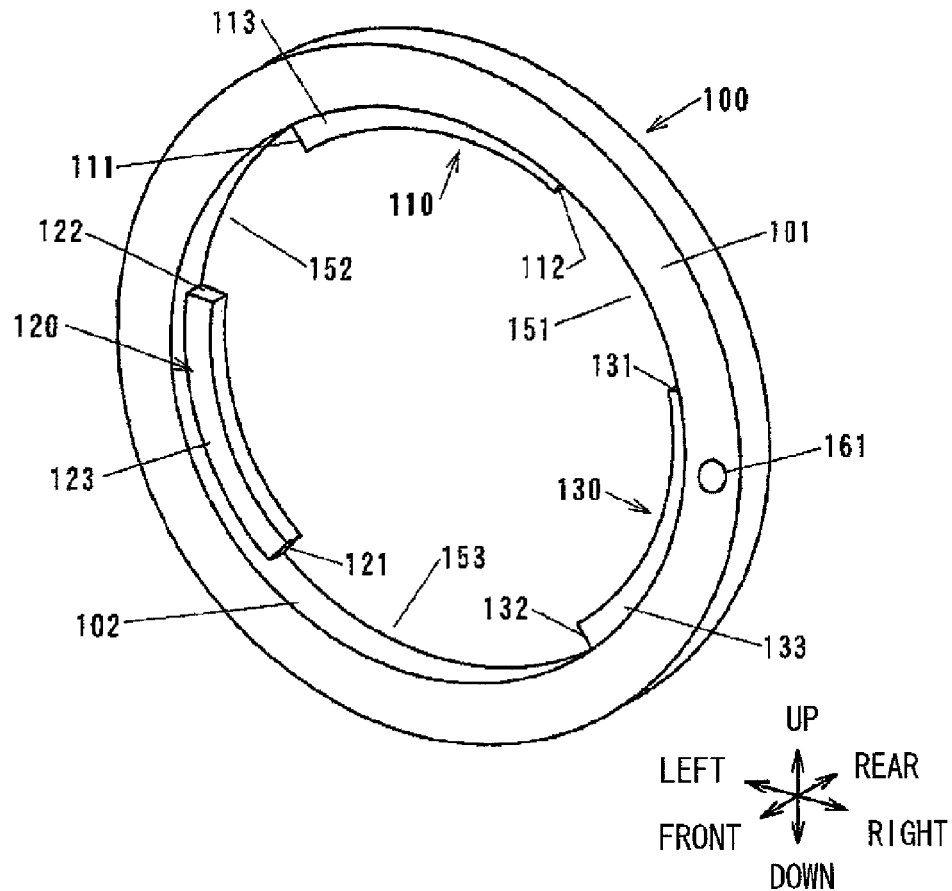
FIGS. 2A and 2B are perspective views schematically showing the structure of a body side mount as viewed slantingly from the right front of the camera body.

FIG. 2A is a perspective view schematically showing the structure of the body side mount 100 as viewed slantingly from the right front of the camera body 1, and FIG. 213 is a sectional view of the body side mount 100 in the neighborhood of the lens install/detach lock pin 9. The body side mount 100 has a bayonet construction, in which three claws (body side claws) that are disposed as spaced apart around the border of a circular aperture (around the photographic optical path) in the camera body 1 are provided to project from the outer side of the periphery of the aperture towards its interior. Among these three body side claws, the body side claw that is uppermost will be termed a "first body side claw 110", and then, in order in the anticlockwise direction in the figure from that first body side claw 110, the other two claws will be termed a "second body side claw 120" and a "third body side claw 130".

The spaces or gaps left between each pair of adjacent body side claws, through which claws upon the accessory side mount 200 (accessory side claws) pass when the photographic lens 2 is installed or detached as will be described hereinafter, will be termed "body side cutaways". The body side cutaway between the third body side claw 130 and the first body side claw 110 will be termed a "first body side cutaway 151", and then, in order in the anticlockwise direction in the figure from that first body side cutaway 151, the other two cutaways will be termed a "second body side cutaway 152" and a "third body side cutaway 153".

The front surface of the first body side claw 110 will be termed its "front surface 113", its end surface in the anticlockwise direction as viewed in the figure that faces the second body side cutaway 152 will be termed its "first end surface 111", and its end surface in the clockwise direction as viewed in the figure that faces the first body side cutaway 151 will be termed its "second end surface 112". In a similar manner, the front surface of the second body side claw 120 will be termed its "front surface 123", its end surface that faces the third body side cutaway 153 will be termed its "first end surface 121", and its end surface that faces the second body side cutaway 152 will be termed its "second end surface 122". Moreover, the front surface of the third body side claw 130 will be termed its "front surface 133", its end surface that faces the first body side cutaway 151 will be termed its "first end surface 131", and its end surface that faces the third body side cutaway 153 will be termed its "second end surface 132". It should be understood that the first end surfaces 111, 121, and 131 face in an installation direction that will be described hereinafter, while the second end surfaces 112, 122, and 132 face in the direction opposite to that installation direction (i.e. in a detachment direction) that also will be described hereinafter.

While this feature is not shown in FIG. 2A, it should be understood that the rear surface of the first body side claw 110 will be termed its "rear surface", and is denoted by the reference symbol 114. In a similar manner, the rear surface of the second body side claw 120 and the rear surface of the third body side claw 130 will be termed their "rear surfaces", and are respectively denoted by the reference symbols 124 and 134.

Figure 2B:
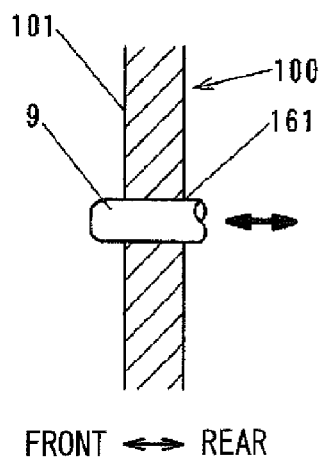

The reference symbol 101 denotes a reference surface of the body side mount. This body side mount reference surface 101 is a toroidal planar surface that is formed to face forwards, and is a surface that serves as a reference for limiting the position in the forward and backward direction of the photographic lens 2 by abutting against an accessory side mount reference surface 201 that will be described hereinafter of the accessory side mount 200 when installation of the photographic lens 2 has been completed. Moreover, 102 denotes the cylindrical inner circumferential surface of the body side mount 100, and this serves as a reference surface into which a fitting portion 202 that will be described hereinafter of the accessory side mount 200 fits, for making the optical axis of the photographic lens 2 coincide with the optical axis of the camera body 1 (i.e. with the central axis of the photographic optical path 3). And 161 denotes a pin hole for allowing projection and withdrawal of the lens install/detach lock pin 9. It should be understood that, as shown in FIGS. 1 and 2B, the forward end of the lens install/detach lock pin 9 is projected further forward than the body side mount reference surface 101 by the biasing force of a spring not shown in the figures. When the user presses a lens install/detach button not shown in the figures, the lens install/detach lock pin 9 is retracted backward against the resistance of the biasing force of the spring not shown in the figures, so that its forward end is pulled further backward than the body mount reference surface 101.

—The Accessory Side Mount 200—

Figure 3:
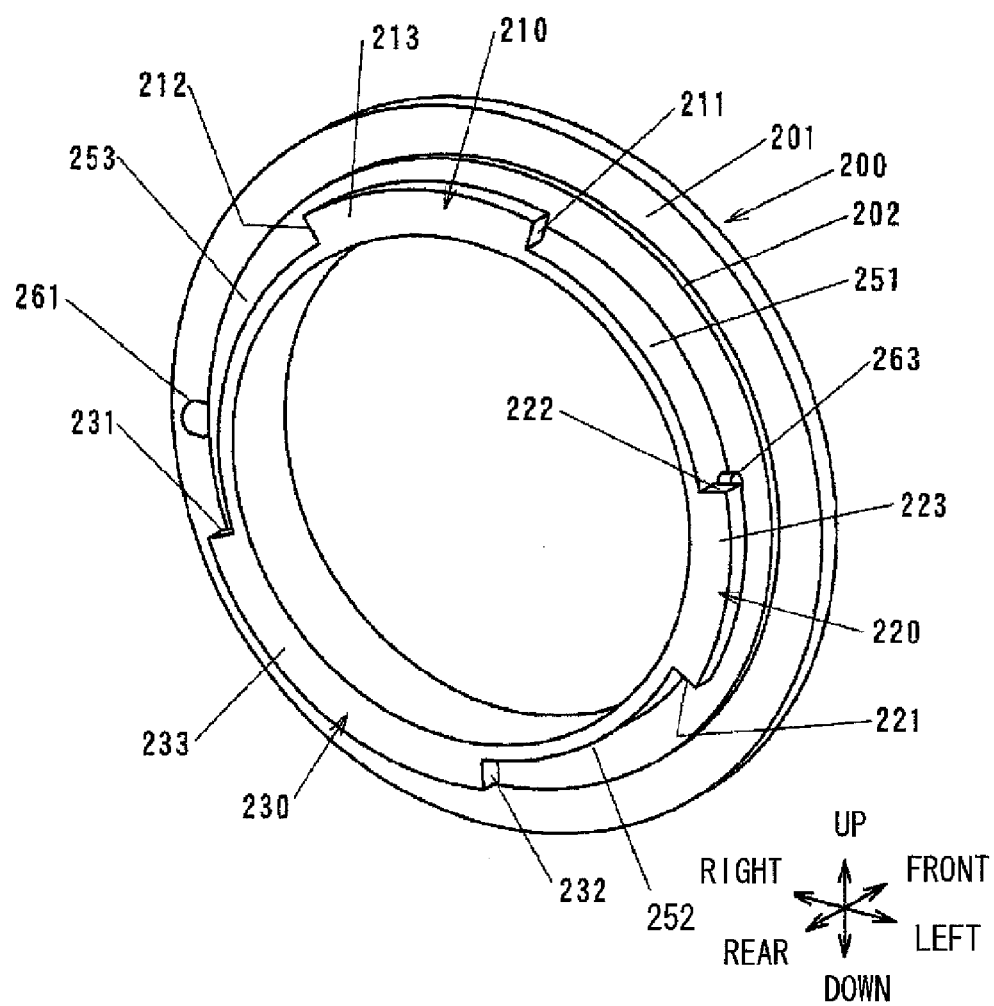
FIG. 3 is a perspective view schematically showing the structure of an accessory side mount as viewed slantingly from the left rear of the photographic lens.

FIG. 3 is a perspective view schematically showing the structure of the accessory side mount 200 as viewed slantingly from the left rear of the photographic lens 2. It should be understood that the accessory side mount 200 shown in FIG. 3 is shown in a state in which installation of the photographic lens 2 to the camera body 1 has been completed (i.e. in an installation completed state), in other words, in a state in which photography is possible. Accordingly, the orientation of the accessory side mount 200 shown in FIG. 3 in the upward and downward direction, and in the leftward and rightward direction, and the upward and downward direction and the leftward and rightward direction of the camera body 1, coincide. In the following explanation, if not explicitly stated otherwise, the orientation of the accessory side mount 200 in the upward and downward direction and in the leftward and rightward direction should be understood to be this orientation corresponding to the installation completed state.

The accessory side mount 200 has a bayonet construction, in which three claws (accessory side claws) that are disposed as spaced apart around its circumferential direction are provided to project from the inner side of its periphery towards its exterior. Among these three accessory side claws, the accessory side claw that is uppermost will be termed a "first accessory side claw 210", and then, in order in the clockwise direction in the figure from that first accessory side claw 210, the other two claws will be termed a "second accessory side claw 220" and a "third accessory side claw 230".

The spaces or gaps left between each pair of adjacent accessory side claws, through which the body side claws pass when the photographic lens 2 is installed or detached as will be described hereinafter, will be termed "accessory side cutaways". The accessory side cutaway between the first accessory side claw 210 and the second accessory side claw 220 will be termed a "first accessory side cutaway 251", and then, in order in the clockwise direction in the figure from that first accessory side cutaway 251, the other two cutaways will be termed a "second accessory side cutaway 252" and a "third accessory side cutaway 253".

The rear surface of the first accessory side claw 210 will be termed its "rear surface 213", its end surface that faces the first accessory side cutaway 251 will be termed its "first end surface 211", and its end surface that faces the third accessory side cutaway 253 will be termed its "second end surface 212". In a similar manner, the rear surface of the second accessory side claw 220 will be termed its "rear surface 223", its end surface that faces the second accessory side cutaway 252 will be termed its "first end surface 221", and its end surface that faces the second accessory side cutaway 251 will be termed its "second end surface 222". Moreover, the rear surface of the third accessory side claw 230 will be termed its "rear surface 233", its end surface that faces the third accessory side cutaway 253 will be termed its "first end surface 231", and its end surface that faces the second accessory side cutaway 252 will be termed its "second end surface 232". It should be understood that the first end surfaces 211, 221, and 231 face in the installation direction that will be described hereinafter, while the second end surfaces 212, 222, and 232 face in the direction opposite to that installation direction (i.e. in the detachment direction) that will be described hereinafter.

While this feature is not shown in FIG. 3, it should be understood that the front surface of the first accessory side claw 210 will be termed its "front surface", and is denoted by the reference symbol 214. In a similar manner, the front surface of the second accessory side claw 220 and the front surface of the third accessory side claw 230 will be termed their "front surfaces", and are respectively denoted by the reference symbols 224 and 234.

The reference symbol 201 denotes a reference surface of the accessory side mount. This accessory side mount reference surface 201 is a toroidal planar surface that is formed to face backwards, and is abutted against the body side mount reference surface 101 when installation has been completed. Moreover, the reference symbol 202 denotes a fitting portion, and is a cylindrical surface that fits into the inner circumferential surface 102 of the body side mount 100 and serves as a reference surface for making the optical axis of the photographic lens 2 coincide with the optical axis of the camera body 1 (i.e. with the central axis of the photographic optical path 3). And the reference symbol 261 denotes a pin hole, into which the lens install/detach lock pin 9 that projects from or withdraws into the pin hole 161 of the body side mount 100 is inserted, in order to fix the photographic lens 2 so that it cannot rotate with respect to the camera body 1 (i.e. with respect to the body side mount 100) when installation of the photographic lens 2 has been completed.

Figure 4:
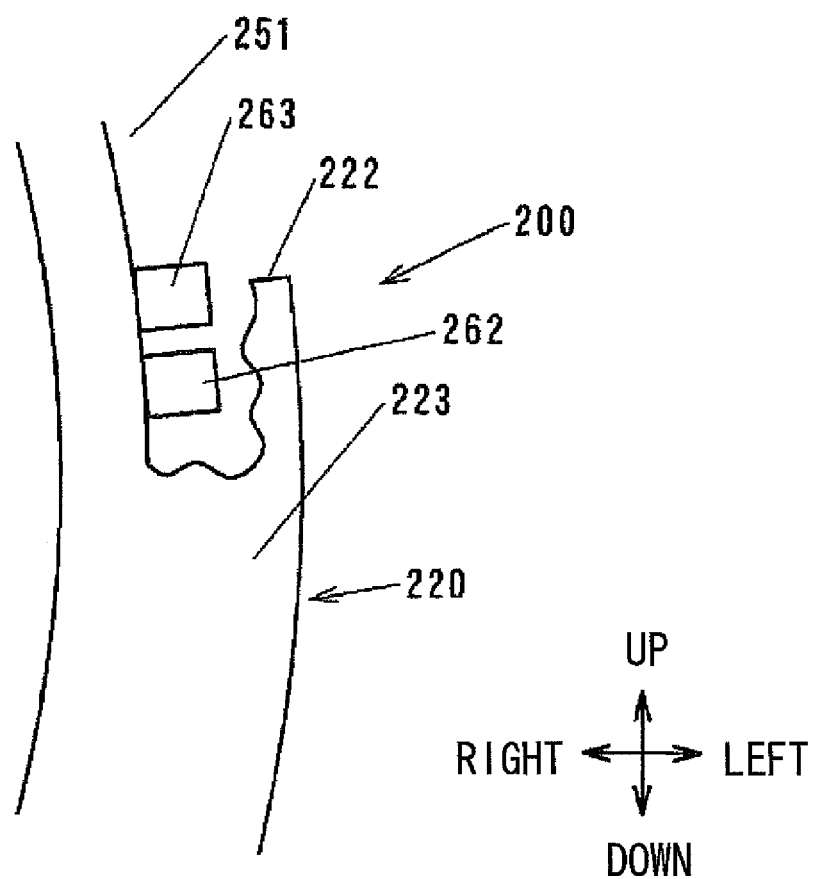
FIG. 4 is a figure for explanation of positions in which limit members are disposed.

As shown in FIGS. 3 and 4, limit members 262 and 263 are provided in front of the second accessory side claw 220 and in the neighborhood of its second end surface 222 (here, as previously explained, "in front of" means towards the photographic subject side, or, to put it in another manner, towards the side from which the light from the photographic subject is incident), and these limit members 262 and 263 serve as limiting portions that limit the range of rotation of the photographic lens 2 (i.e. of the accessory side mount 200) with respect to the camera body 1 (i.e. with respect to the body side mount 100) when the photographic lens 2 is being installed or detached. The details of this limitation of the range of rotation by the limit members 262 and 263 will be described hereinafter. The limit members 262 and 263 may, for example, be pins with heads that are both screwed in radially inwards from the radial exterior of the accessory side mount 200. It should be understood that FIG. 4 is a figure showing a portion of the second accessory side claw 220 in the neighborhood of its second end surface 222 as viewed from the rear (as previously explained, "rear" means the rear side of the camera body 1 where the imaging element 5 is provided, or, to put it in another manner, the side toward which the light from the photographic subject is emitted), and, in this figure, the second accessory side claw 220 is shown as partly cut away, in order for the limit members 262 and 263 to be visible.

—The Details of the Positions of the Body Side Claws and the Body Side Cutaways—

Figure 5:
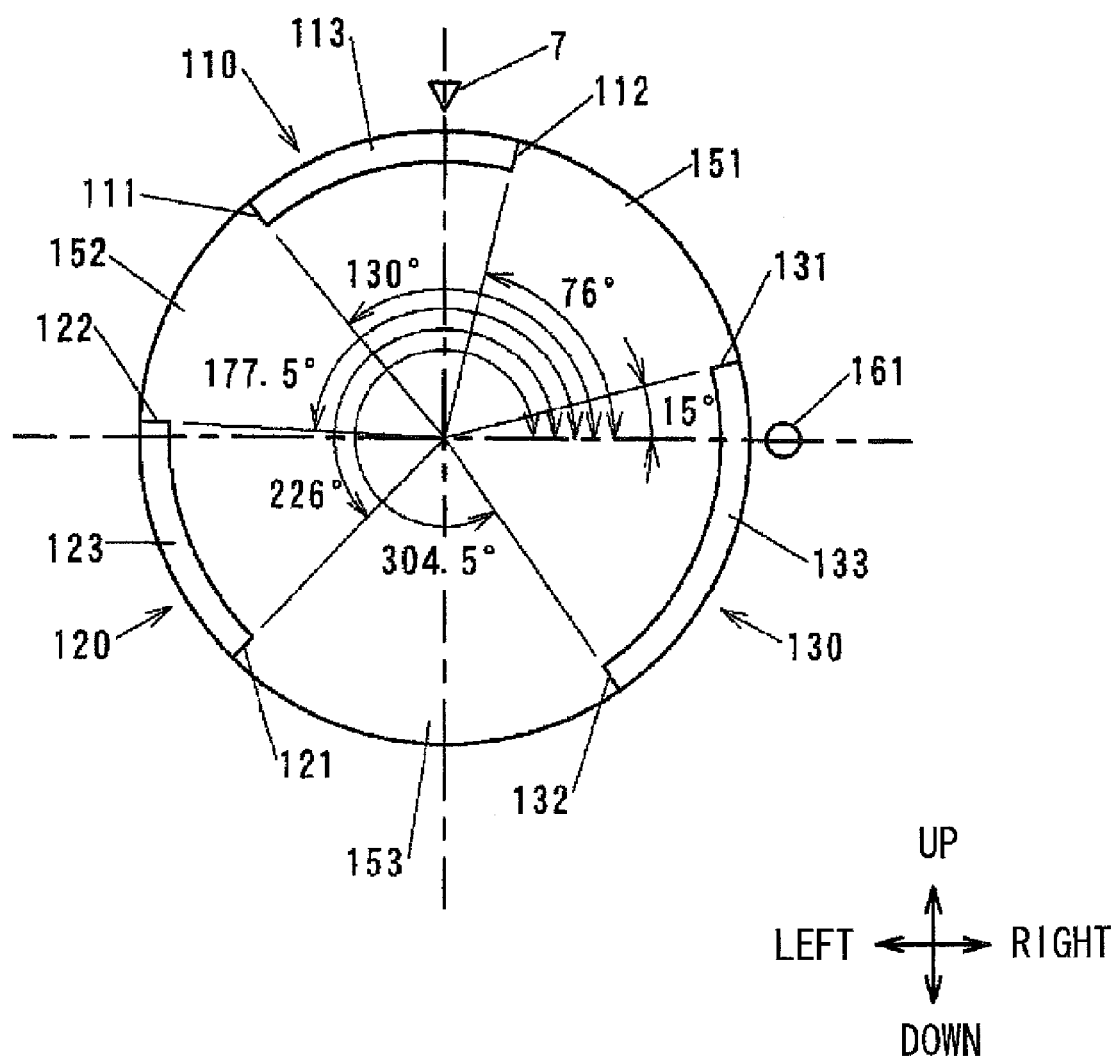
FIG. 5 is a figure showing the positions of body side claws and body side cutaways of the body side mount, when the body side mount is viewed from the front of the camera body.

FIG. 5 is a figure showing the positions of the body side claws and the body side cutaways of the body side mount 100, when the body side mount 100 is viewed from the front of the camera body 1. When the body side mount 100 is viewed from the front of the camera body 1, the positions in which the body side claws are disposed, as given by angles in the anticlockwise direction and taking the 3 o'clock direction as a zero reference, are as follows. The first body side claw 110 extends over the range from 76° to 130°. The second body side claw 120 extends over the range from 177.5° to 226°. And the third body side claw 130 extends over the range from 304.5° to 15° (i.e. 375°).

When the size of each of the body side claws 110 through 130 is expressed as an angular distance along the edge of the circular aperture of the body side mount 110, the first body side claw 110 covers 54°, the second body side claw 120 covers 48.5°, and the third body side claw 130 covers 70.5°. In a similar manner, when the size of each of the body side cutaways 151 through 153 is expressed as an angular distance along the edge of the circular aperture of the camera body 1, the first body side cutaway 151 covers 61°, the second body side cutaway 152 covers 47.5°, and the third body side cutaway 153 covers 78.5°. In other words, upon the camera body side mount 100, the smallest one of the cutaways is the second body side cutaway 152 (whose angular distance covers 47.5°).

In FIG. 5, the reference symbol 7 is a mark that shows the position of an indicator that is provided upon the camera body 1. This indicator serves as a guide when installing the photographic lens 2 to the camera body 1. The position of the mark 7 is at an angle of 90° in the anticlockwise direction, if the direction of 3 o'clock when the body side mount 100 is viewed from the front of the camera body 1 is taken as a zero reference.

—The Details of the Positions of the Accessory Side Claws and the Accessory Side Cutaways—

Figure 6:
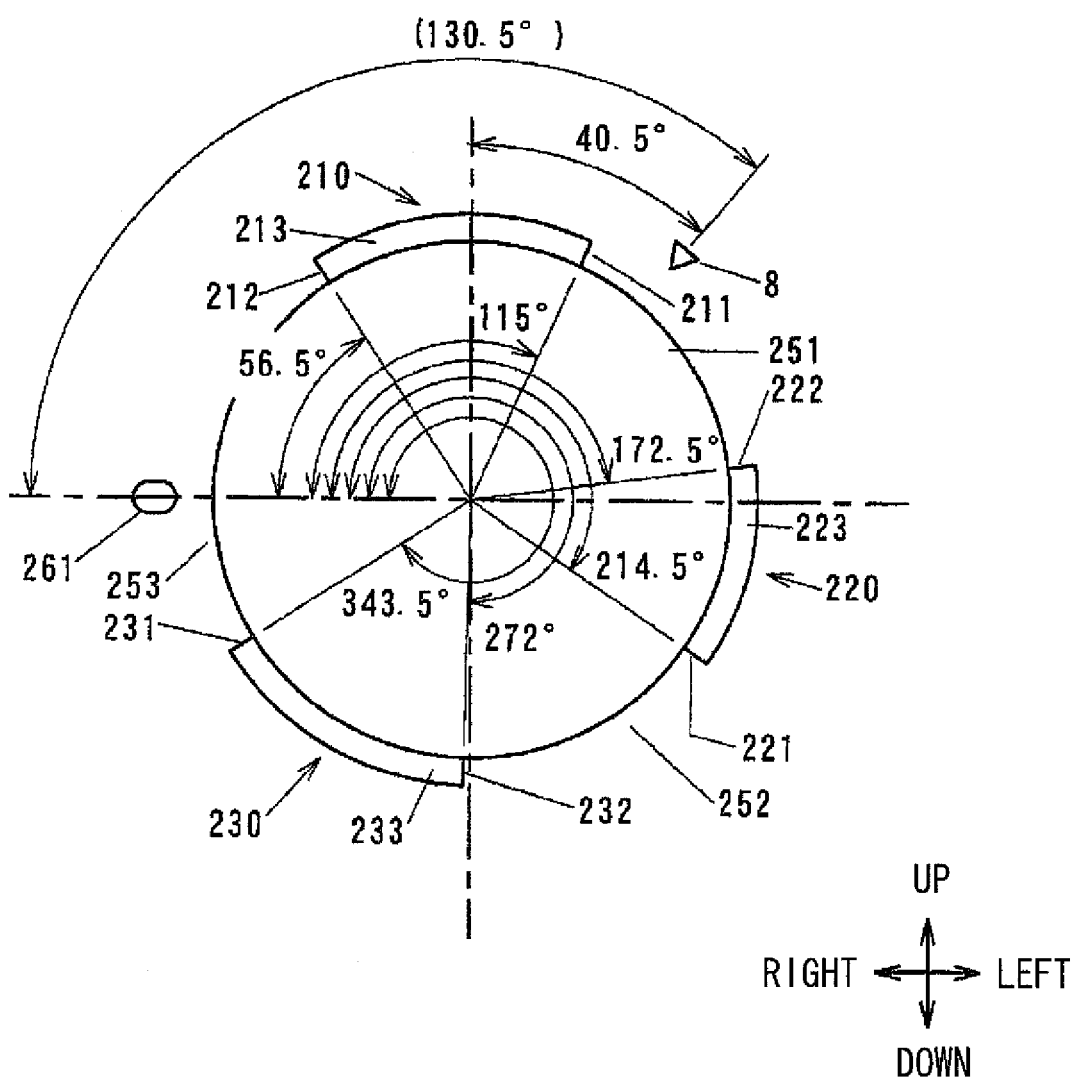
FIG. 6 is a figure showing the positions of accessory side claws and accessory side cutaways of the accessory side mount, when the accessory side mount is viewed from the rear of the photographic lens.

FIG. 6 is a figure showing the positions of the accessory side claws and the accessory side cutaways of the accessory side mount 200, when the accessory side mount 200 is viewed from the rear of the photographic lens 2. When the accessory side mount 200 is viewed from the rear of the photographic lens 2 with the photographic lens 2 in the above described installation completed state, the positions in which the accessory side claws are disposed, as given by angles in the clockwise direction and taking the 9 o'clock direction as a zero reference, are as follows. The first accessory side claw 210 extends over the range from 56.5° to 115°. The second accessory side claw 220 extends over the range from 172.5° to 214.5°. And the third accessory side claw 230 extends over the range from 272° to 343.5°.

When the length through which each of the accessory side claws 210 through 230 extends along the circumferential direction of the accessory side mount 200 is expressed as an angular distance along the circumferential direction of the accessory side mount 200, the first accessory side claw 210 covers 58.5°, the second accessory side claw 220 covers 42°, and the third accessory side claw 230 covers 71.5°. To put this in another manner, for these first through third accessory side claws, when the claws are considered as circular arcs whose lengths extend along the circumferential direction, the angle covered by each of the claws (i.e. the angle through which it is present) is 58.5° for the first accessory side claw 210, 42° for the second accessory side claw 220, and 71.5° for the third accessory side claw 230. In other words, the smallest one of the claws upon the accessory side is the second accessory side claw 220 (whose angular range is 42°).

In a similar manner, when the size of each of the accessory side cutaways 251 through 253 is expressed as an angular distance along the circumferential direction of the accessory side mount 200, the first accessory side cutaway 251 covers 57.5°, the second accessory side cutaway 252 covers 57.5°, and the third accessory side cutaway 253 covers 73°.

In FIG. 6, the reference symbol 8 is a mark that shows the position of an indicator that is provided upon the photographic lens 2. This indicator serves as a guide when installing the photographic lens 2 to the camera body 1. The position of the mark 8 is at an angle of 130.5° in the clockwise direction, if the direction of 9 o'clock when the accessory side mount 200 is viewed from the rear of the photographic lens 2 is taken as a zero reference, with the photographic lens 2 in the above described installation completed state. This angle corresponds to an angle that is obtained by adding 90° to an installation angle of 40.5° that will be described hereinafter.

—Installation of the Photographic Lens 2 to the Camera Body 1—

Figure 7:
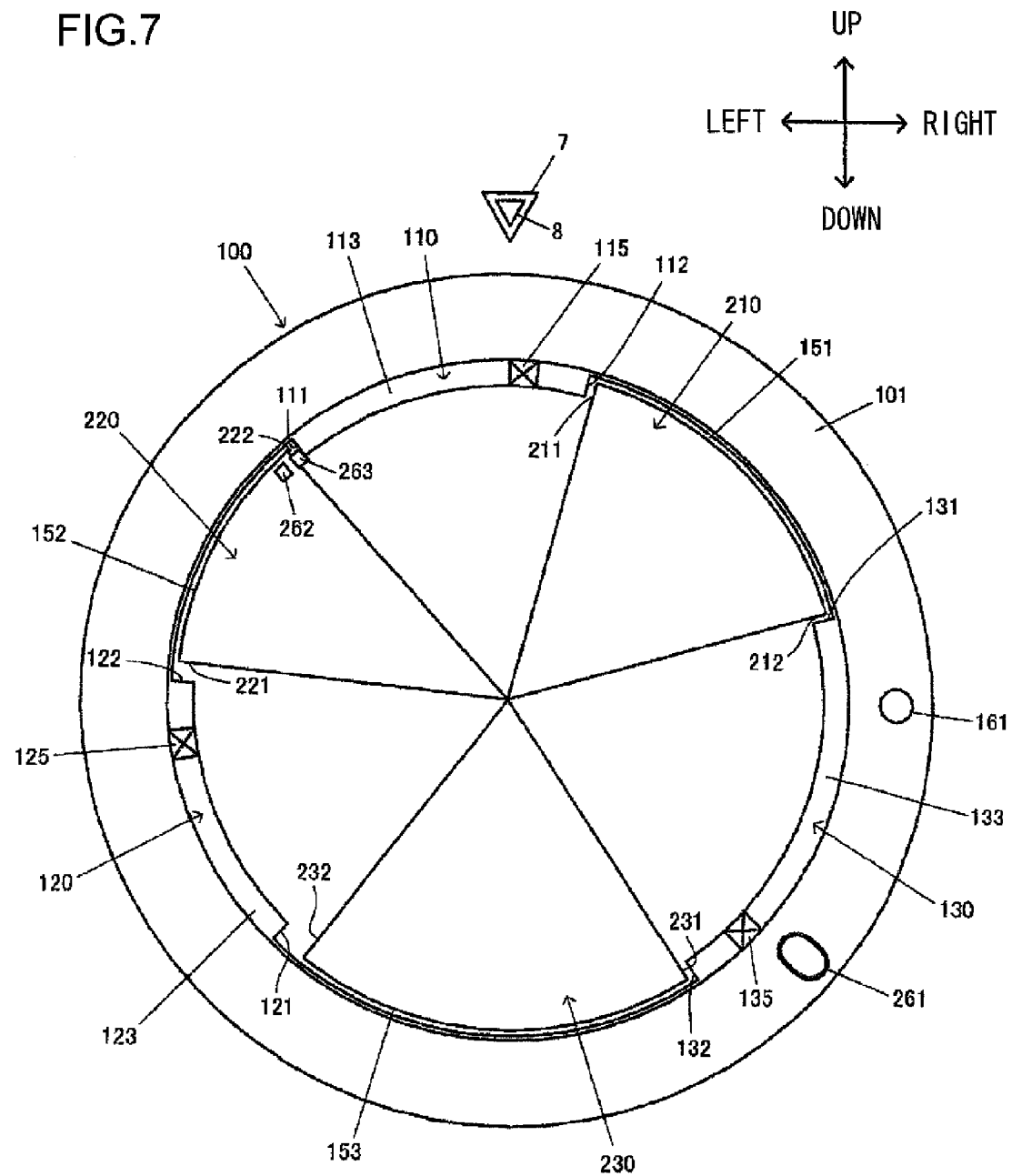
FIG. 7 is a figure showing whether or not any interference (i.e. any overlapping state) is taking place between the body side claws and the accessory side claws.

The installation of the photographic lens 2 having this structure to the camera body 1 is performed in the following manner. It should be understood that, in the state in which the axis along which the center of the photographic optical path of the camera body 1 extends in the forward and backward direction coincides with the optical axis of the photographic lens 2, the rotational position of the photographic lens 2 with respect to the camera body 1 will, in the following, simply be termed the "installation and detachment rotational phase". When the axis along which the center of the photographic optical path of the camera body 1 extends in the forward and backward direction and the optical axis of the photographic lens 2 are made to coincide with one another, and the rotational position of the indicator 8 provided upon the photographic lens 2 is made to match the rotational position of the indicator 7 provided upon the camera body 1, then, as shown in FIG. 7, the body side claws 110 through 130 do not interfere with the accessory side claws 210 through 230, and it is possible to insert the accessory side mount 200 into the body side mount 100 until the accessory side mount reference surface 201 and the body side mount reference surface 101 abut against one another. The installation and detachment rotational phase at this time will be termed the "proper installation and detachment rotational phase". It should be understood that FIG. 7 is a figure showing whether or not any interference (i.e. any overlapping state) is taking place between the body side claws 110 through 130 and the accessory side claws 210 through 230, and the accessory side claws are schematically shown in this figure as having fan-like shapes.

When the accessory side mount 200 is inserted into the body side mount 100 in the proper installation and detachment rotational phase, the first accessory side claw 210 passes through from the front to the rear of the first body side cutaway 151, the second accessory side claw 220 passes through from the front to the rear of the second body side cutaway 152, and the third accessory side claw 230 passes through from the front to the rear of the third body side cutaway 153. In a similar manner, when the accessory side mount 200 is inserted into the body side mount 100 in the proper installation and detachment rotational phase, the first body side claw 110 passes through from the rear to the front of the first accessory side cutaway 251 (no reference symbol is shown in FIG. 7), the second body side claw 120 passes through from the rear to the front of the second accessory side cutaway 252 (no reference symbol is shown in FIG. 7), and the third body side claw 130 passes through from the rear to the front of the third accessory side cutaway 253 (no reference symbol is shown in FIG. 7).

Figure 8:
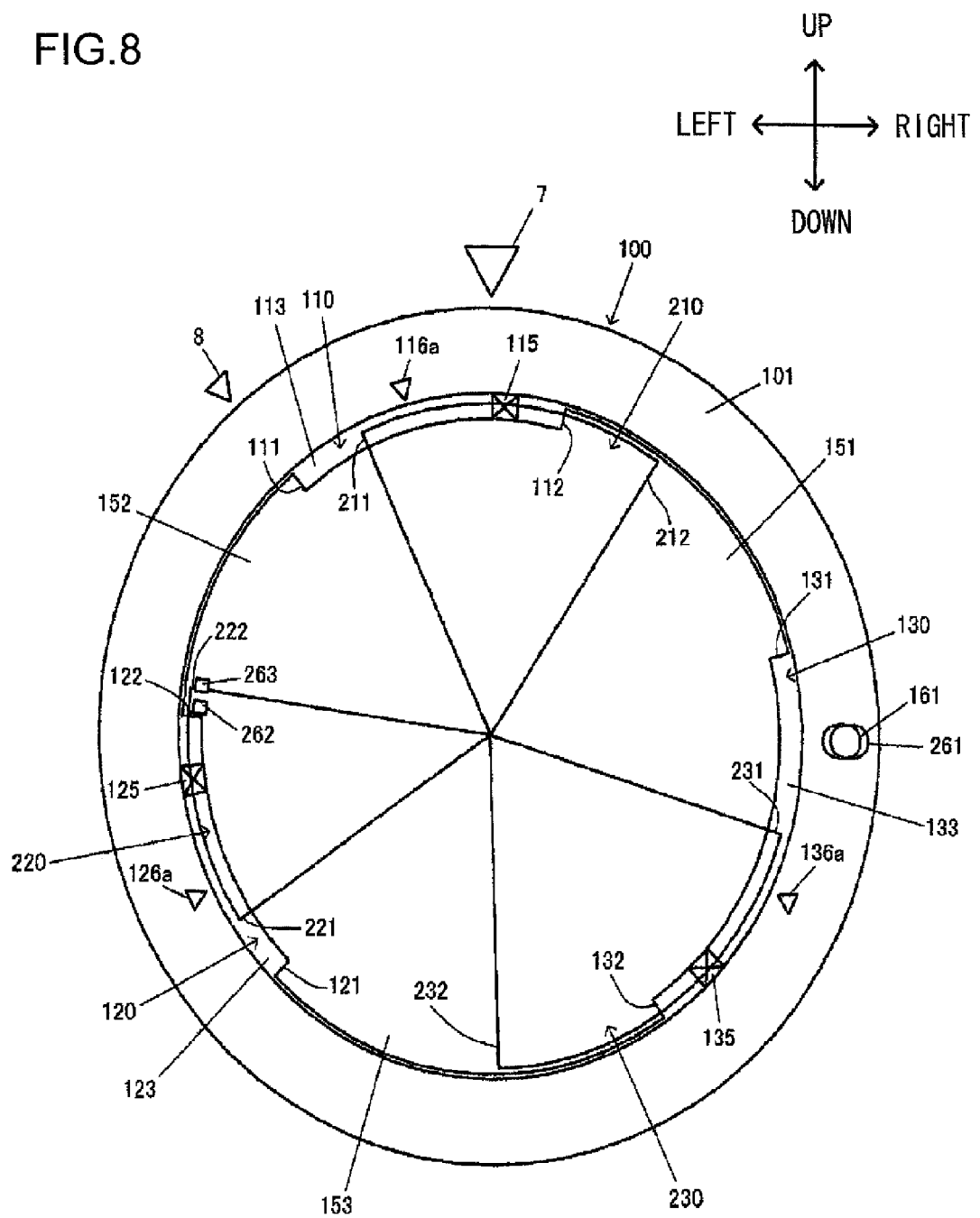
FIG. 8 is another figure showing whether or not any interference (i.e. any overlapping state) is taking place between the body side claws and the accessory side claws.

After the accessory side mount 200 has been inserted into the body side mount 100 in the proper installation and detachment rotational phase, when the photographic lens 2 is rotated in the anticlockwise direction as viewed from the front of the camera body 1, the first accessory side claw 210 slides in behind the first body side claw 110, the second accessory side claw 220 slides in behind the second body side claw 120, and the third accessory side claw 230 slides in behind the third body side claw 130. When the photographic lens 2 is rotated in this manner in the anticlockwise direction as viewed from the front of the camera body 1, and has been rotated through 40.5° from the proper installation and detachment rotational phase as shown in FIG. 8, then the lens install/detach lock pin 9 that projects from the pin hole 161 of the body side mount 100 moves forward and is inserted into the pin hole 261 of the accessory side mount 200, and the rotation in the anticlockwise direction is limited. It should be understood that, if the photographic lens 2 is rotated in the anticlockwise direction while the lens install/detach lock pin 9 is forcibly retracted below the body side mount reference surface 101 by the lens install/detach button not shown in the figures being continuously pressed, then the limit member 262 abuts against the second end surface 122 of the second body side claw 120, so that the rotation in the anticlockwise direction is limited. Moreover, it should be understood that the limit member 262 may also be termed the "installation side limit member 262".

When the photographic lens 2 has been rotated through 40.5° in the anticlockwise direction from the proper installation and detachment rotational phase in this manner, the accessory side mount 200 is coupled to the body side mount 100 (i.e. the coupling together of the accessory side claws and the body side claws is completed), and the installation of the photographic lens 2 is completed. The angle of rotation of the photographic lens 2 of 40.5° from the proper installation and detachment rotational phase to when the installation of the photographic lens 2 is completed will be termed the "installation angle". Moreover, the rotational direction in the anticlockwise direction as described above is also termed the "installation direction".

It should be understood that the smaller the installation angle is, the easier the installation becomes, and moreover the amount of abrasion between electric contact points not shown in the figures on the camera body 1 side and the photographic lens 2 side can be reduced, so that it is possible to reduce the wear on these electric contact points caused by exchanging of the photographic lens 2. However, if the installation angle is too small, then there is a risk that the engagement between the claws may unexpectedly become separated, and that it may become easy for the photographic lens 2 to fall off. On the other hand, a certain angular length for the body side mount 100 in the circumferential direction is required in order to provide springs 116, 126, and 136, abutting portions 115, 125, and 135, and sloped surfaces 117, 127, and 137 that will be described hereinafter. Moreover, a certain installation angle is required in order for the accessory side claws 210 through 230, that have passed the sloped surfaces 117, 127, and 137, to grip the springs 116, 126, and 136 and the abutting portions 115, 125, and 135 sufficiently. Thus, in this embodiment, the installation angle is set to 40.5° due to these considerations.

When the installation of the photographic lens 2 is complete, the position of the pin hole 261 of the accessory side mount 200 overlaps and coincides with the position of the pin hole 161 of the body side mount 100. And the lens install/detach lock pin 9 that projects from and withdraws into the pin hole 161 is inserted into the pin hole 261.

—When the Installed Photographic Lens 2 is to be Detached from the Camera Body 1—

When the photographic lens 2 that has been installed is to be detached from the camera body 1, the following procedure is performed. First, the lens install/detach button not shown in the figures provided to the camera body 1 is pressed, and thereby the lens install/detach lock pin 9 is retracted from the pin hole 261. When, with this state being maintained, the photographic lens 2 is rotated in the clockwise direction as viewed from the front of the camera body 1 as far as the proper installation and detachment rotational phase, the mutual coupling of the accessory side claws and the body side claws is released. And, when the photographic lens 2 is rotated as far as the proper installation and detachment rotational phase, the limit member 263 abuts against the first end surface 111 of the first body side claw 110, so that rotation in the clockwise direction is limited. In other words, the system is returned to the state shown in FIG. 7. Since in the proper installation and detachment position, as described above, there is no interference between the body side claws 110 through 130 and the accessory side claws 210 through 230, accordingly it is possible to remove the photographic lens 2 forward away from the camera body 1. It should be understood that the clockwise rotational direction described above is also termed the "detachment direction". Moreover, the limit member 263 is also termed the "detachment side limit member 263".

As described above, when an attempt is made to install the photographic lens 2 to the camera body 1 with the lens install/detach button not shown in the figures still being pressed, the installation side limit member 262 abuts against the second end surface 122 of the second body side claw 120, and thereby rotation of the photographic lens 2 in the installation direction is limited. Moreover, when the photographic lens 2 that is installed is removed from the camera body 1, the detachment side limit member 263 abuts against the first end surface 111 of the first body side claw 110, and thereby rotation in the detachment direction is limited.

Here, the end surface of the installation side limit member 262 that abuts against the second end surface 122 of the second body side claw 120 when the photographic lens 2 is installed to the camera body 1 with the lens install/detach button not shown in the figures still being pressed will be termed its "installation side end surface". Moreover, the end surface of the detachment side limit member 263 that abuts against the first end surface 111 of the first body side claw 110 when the photographic lens 2 that is installed is removed from the camera body 1 will be termed its "detachment side end surface". In other words, on the accessory side mount 200 that has been inserted into the body side mount 100 in the proper installation and detachment rotational phase shown in FIG. 7, the installation side end surface of the installation side limit member 262 is removed in the clockwise direction as viewed in FIG. 7 from the second end surface 122 of the second body side claw 120 by just an angle equal to the installation angle plus a predetermined angular amount for clearance. Moreover, on the accessory side mount 200 that has been inserted into the body side mount 100 in the proper installation and detachment rotational phase shown in FIG. 7, the detachment side end surface of the detachment side limit member 263 is removed in the anticlockwise direction as viewed in FIG. 7 from the first end surface 111 of the first body side claw 110 by just an angle equal to a predetermined angular amount for clearance. It should be understood that, for convenience, the detachment side end surface of the detachment side limit member 263 is shown in the FIG. 7 view as being in contact with the first side surface 111 of the first body side claw 110.

—Concerning the Coupled State of the Accessory Side Claws and the Body Side Claws—

Figure 9:
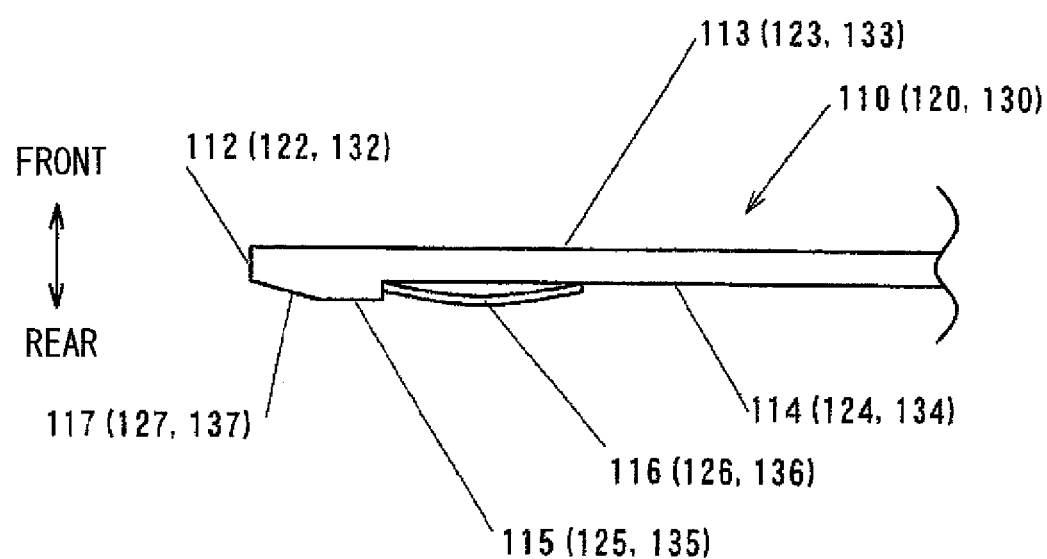
FIG. 9 is a figure schematically showing the way in which a first body side claw progresses circumferentially, as viewed from outward thereof in the radial direction.

FIG. 9 is a figure schematically showing the way in which the first body side claw 110 progresses circumferentially, as viewed from outward thereof in the radial direction. In order to make it possible for the first accessory side claw 210 to slide in smoothly behind the first body side claw 110 when the photographic lens 2 is being installed, a sloped surface 117 is provided in the neighborhood of the second end surface 112 of the first body side claw 110 by its rear side surface 114 being formed in a sloped shape. And, carrying on from the sloped surface 117, an abutting portion 115 is provided in the neighborhood of the second end surface 112 of the first body side claw 110, this abutting portion 115 being a surface that is perpendicular with respect to the forward and backward direction of the body side mount 100. Moreover, a spring 116 is provided upon the rear surface 114, adjacent to this abutting portion 115.

The spring 116 is an elastic member for making the accessory side mount reference surface 201 and the body side mount reference surface 101 abut against one another by contacting against the front surface 214 (not shown in FIG. 9) of the first accessory side claw 210 that has been inserted behind the first body side claw 110 and pressing this surface 214 rearward. If, for example, an external force is exerted upon the photographic lens 2 when its installation has been completed and an attempt is made to tilt the photographic lens 2 with respect to the camera body 1 against the resistance of the biasing force of the spring 116, then the abutting portion 115 is an area that abuts against the front surface 214 of the first accessory side claw 210 and that limits shifting forward of the first accessory side claw 210. It should be understood that when, due to the biasing force of the spring 116, the accessory side mount reference surface 201 and the body side mount reference surface 101 are being abutted together (i.e. are being closely pressed together), then the abutting portion 115 is slightly removed from the front surface 214 of the first accessory side claw 210.

A similar structure is implemented for the second body side claw 120 and for the third body side claw 130. In other words, a sloped surface 127 is provided in the neighborhood of the second end surface 122 of the second body side claw 120 by its rear side surface 124 being formed in a sloped shape. And, carrying on from the sloped surface 127, an abutting portion 125 is provided in the neighborhood of the second end surface 122 of the second body side claw 120, this abutting portion 125 being a surface that is perpendicular with respect to the forward and backward direction of the body side mount 100. Moreover, a spring 126 is provided upon the rear surface 124, adjacent to this abutting portion 125. Similarly, a sloped surface 137 is provided in the neighborhood of the second end surface 132 of the third body side claw 130 by its rear side surface 134 being formed in a sloped shape. And, carrying on from the sloped surface 137, an abutting portion 135 is provided in the neighborhood of the second end surface 132 of the third body side claw 130, this abutting portion 135 being a surface that is perpendicular with respect to the forward and backward direction of the body side mount 100. Moreover, a spring 136 is provided upon the rear surface 134, adjacent to this abutting portion 135.

It should be understood that the mark shown by the reference symbol 116a in FIG. 8 is an indication that shows the rotational phase around the circumferential direction of the position where the spring 116 presses the front surface 214 of the first accessory side claw 210. In a similar manner, the mark shown by the reference symbol 126a is an indication that shows the rotational phase around the circumferential direction of the position where the spring 126 presses the front surface 224 of the second accessory side claw 220, and the mark shown by the reference symbol 136a is an indication that shows the rotational phase around the circumferential direction of the position where the spring 136 presses the front surface 234 of the third accessory side claw 230.

As for example shown in FIGS. 7 and 8, the abutting portion 115 is provided approximately at the top of the body side mount 100. And the abutting portion 125 is provided at a position that is spaced from the second end surface 122 of the second body side claw 120 by a distance that is just equal to the separation distance between the second end surface 112 of the first body side claw 110 and the abutting portion 115. Moreover, the abutting portion 135 is provided at a position that is spaced from the second end surface 132 of the third body side claw 130 by a distance that is just equal to the separation distance between the second end surface 112 of the first body side claw 110 and the abutting portion 115.

Figure 10A:
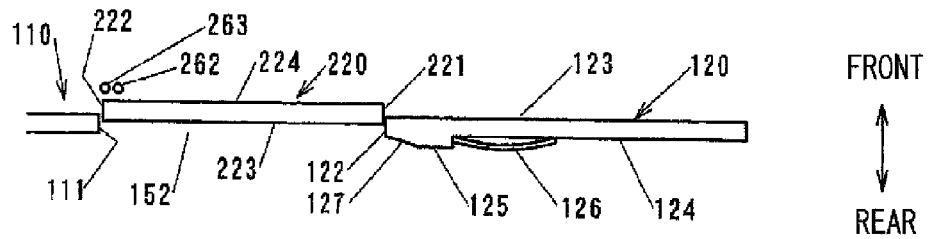
FIGS. 10A through 10F are figures showing changes of the state of engagement between a second accessory side claw and a second body side claw, when the photographic lens is installed and is then detached.
Figure 10B:
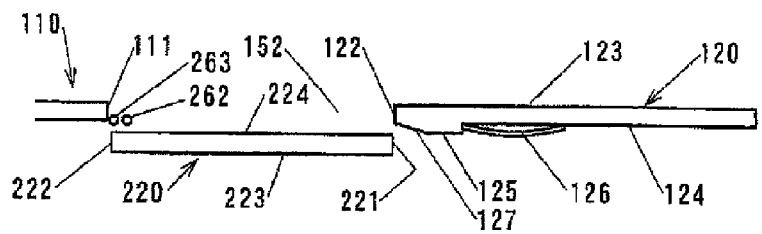

FIGS. 10A through 10F are figures showing, as a time series, the changes of the state of engagement between the second accessory side claw 220 and the second body side claw 120, when the photographic lens 2 is installed to and is then detached from the camera body 1, and are figures schematically showing the way in which the second body side claw 120 progresses along the circumferential direction, as viewed from outward thereof in the radial direction. FIG. 10A is a figure showing the situation when the second accessory side claw 220 of the accessory side mount 200 that has been inserted in the proper installation and detachment rotational phase passes through the second body side cutaway 152. And FIG. 10B is a figure showing the situation of the second accessory side claw 220 and the second body side claw 120 in the state when the second accessory side claw 220 has passed through the second body side cutaway 152, and the accessory side mount reference surface 201 and the body side mount reference surface 101 are abutted together.

Figure 10C:
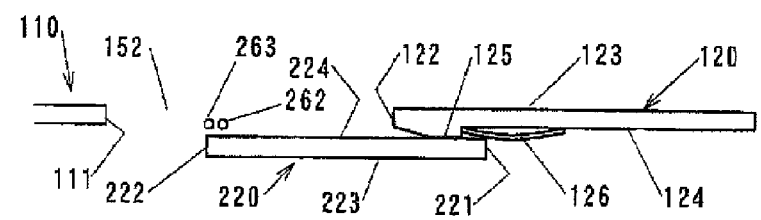
Figure 10D:
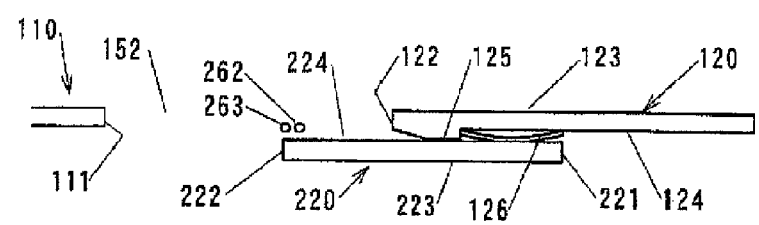

Thereafter, when the photographic lens 2 is rotated in the installation direction, the second accessory side claw 220 enters behind the second body side claw 120, as shown in FIG. 10C. Subsequently, the second accessory side claw 220 slides behind the spring 126, and the second accessory side claw 220 is biased backward by the spring 126, as shown in FIG. 10D. And, when the photographic lens 2 is rotated through just the installation angle from the proper installation and detachment position, then, as shown in FIG. 10E, the rotation of the photographic lens in the installation direction is limited, since the installation side limit member 262 abuts against the second end surface 122 of the second body side claw 120.

Figure 10E:
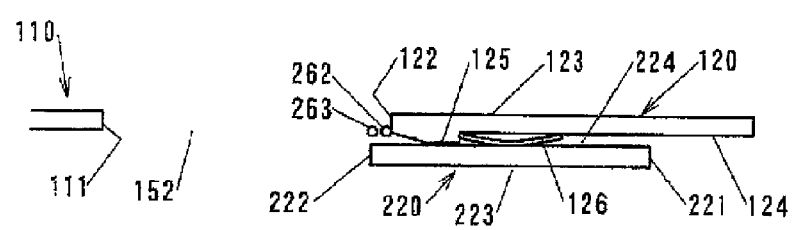
Figure 10F:
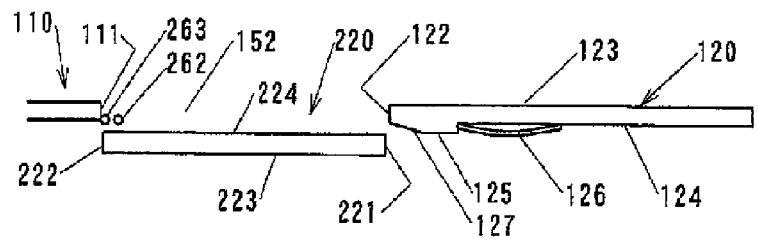

When, in order to detach the photographic lens 2 from the camera body 1, the photographic lens 2 is rotated in the detachment direction from the state shown in FIG. 10E, at the time point that it has been rotated through just the installation angle, the rotation of the photographic lens 2 in the detachment direction is limited as shown in FIG. 10F, since the detachment side limit member 263 abuts against the first end surface 111 of the first body side claw 110.

In this manner, with this structure, during installation of the photographic lens 2, and during detachment thereof, different limit members abut against claws on the body side. In other words, in this structure, it is arranged for different members to fulfill the function of limiting the rotation during installation of the photographic lens 2, and the function of limiting the rotation during detachment of the photographic lens 2. Due to this, the durability of the limit members 262 and 263 is enhanced. Moreover, with these limit members 262 and 263, the loads that act upon the limit members 262 and 263 during their abutting against their corresponding claws upon the body side becomes so called one way pulsating loads or half amplitude loads. By contrast, for example, with the case in which a single limiting member has the functions of both of the limit members 262 and 263, since this member abuts claws on the body side both during installation of the photographic lens 2 and also during detachment of the photographic lens 2, accordingly the load that acts upon this limit member becomes a so called alternating load or full amplitude load. Due to this, if as described above the limit members 262 and 263 are pins with heads, each of which is fitted by being screwed into the accessory side mount 200 from the exterior in the radial direction, then, as compared to the case of a single limit member that serves the function of both of the limit members 262 and 263, it becomes more difficult for them to become loose, and accordingly it is possible to prevent malfunctioning due to the limit members 262 and 263 being loosened.

—If an Attempt is Made to Install the Photographic Lens 2 in Some Rotational Phase Other than the Proper Installation and Detachment Rotational Phase—

With the body side mount 100 and the accessory side mount 200 of this embodiment, if an attempt is made to install the photographic lens 2 in some rotational phase other than the proper installation and detachment rotational phase, then insertion of the accessory side mount 200 into the body side mount 100 is prohibited (i.e. is blocked) by at least two of the body side claws 110 through 130 and at least two of the accessory side claws 210 through 230 abutting together at two or more locations.

As can be clearly understood from FIG. 7, even if an attempt is made to install the photographic lens 2 in the state in which, from the proper installation and detachment rotational phase, the photographic lens has been rotated slightly in the anticlockwise direction as viewed in the figure, then the rear surface 213 of the first accessory side claw 210 abuts against the front surface 113 of the first body side claw 110, the rear surface 223 of the second accessory side claw 220 abuts against the front surface 123 of the second body side claw 120, and the rear surface 233 of the third accessory side claw 230 abuts against the front surface 133 of the third body side claw 130. In this case, the insertion of the accessory side mount 200 into the body side mount 100 is prevented by the three body side claws 110 through 130 abutting against the three accessory side claws 210 through 230. For example, if in FIG. 8 it is hypothesized that the accessory side claws 210 through 230 are positioned in front of the body side claws 110 through 130, then this is an example of the above situation.

Figure 11:
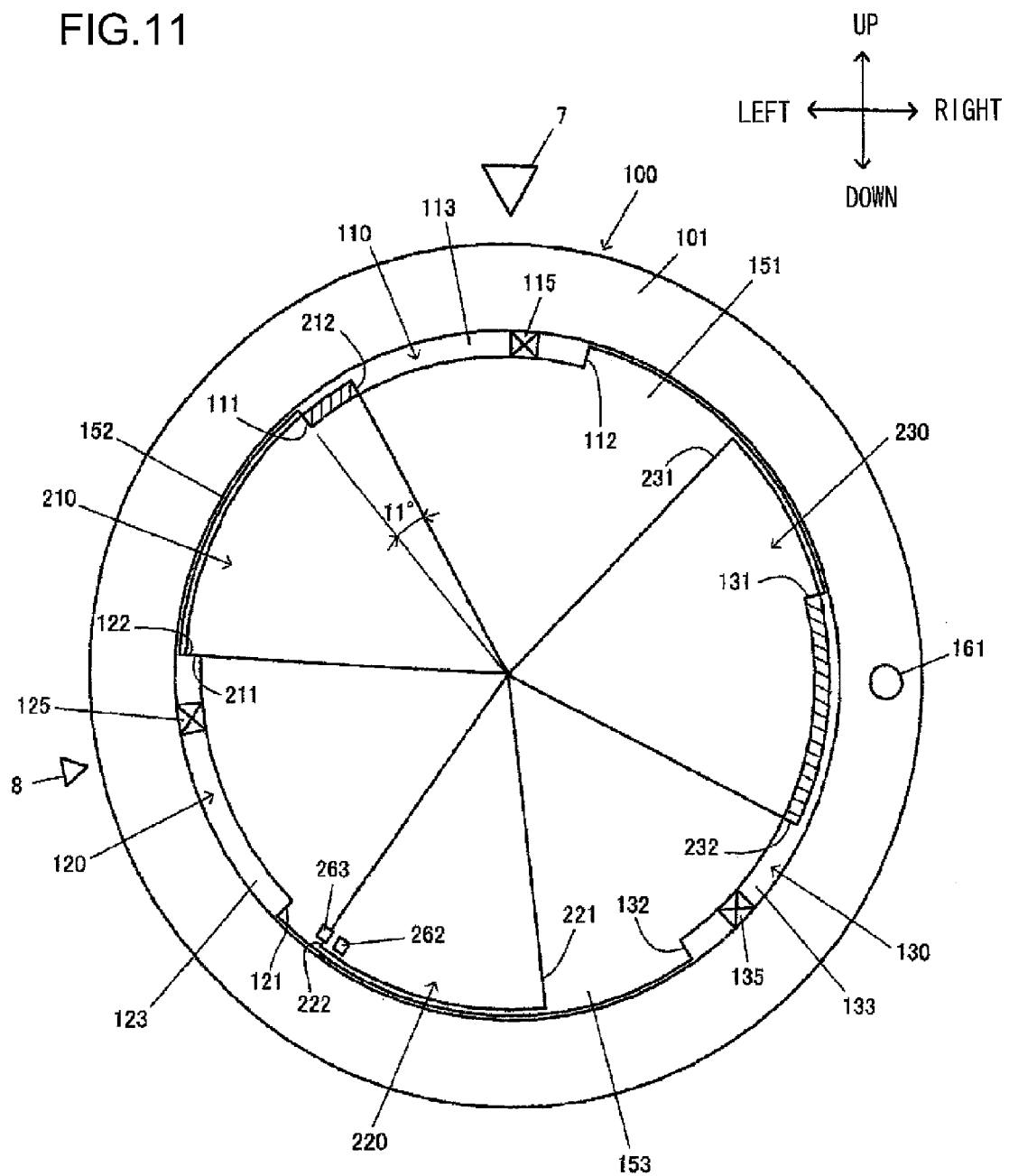
FIG. 11 is a figure showing whether or not any interference (i.e. an overlapping state) is taking place between the body side claws and the accessory side claws.

If, from the state described above, an attempt is made to install the photographic lens 2 in the state in which the photographic lens 2 has been further rotated in the anticlockwise direction as viewed in the figure, then, since the second accessory side claw 220 shifts to be in front of the third body side cutaway 153 as shown in FIG. 11, accordingly the second accessory side claw 220 does not abut against any of the body side claws 110 through 130. However, the rear surface 213 of the first accessory side claw 210 abuts against the front surface 113 of the first body side claw 110, and the rear surface 233 of the third accessory side claw 230 abuts against the front surface 133 of the third body side claw 130. In this case, insertion of the accessory side mount 200 into the body side mount 100 comes to be prevented by two of the body side claws 110 through 130 abutting against two of the accessory side claws 210 through 230. Thus the total number of abutting locations where the body side claws 110 through 130 abut against the accessory side claws, shown by hatching in FIG. 11, is two in all.

If, in the state shown in FIG. 11, the photographic lens 2 is slightly rotated in the anticlockwise direction as viewed in the figure, then the rear surface 213 of the first accessory side claw 210 comes to abut against the front surface 123 of the second body side claw 120. In other words, if the photographic lens 2 is rotated a little bit more in the anticlockwise direction as viewed in the figure, then the body side claws 110 through 130 come to abut against the accessory side claws 210 through 230 at three locations in all. Furthermore if, conversely, from the state shown in FIG. 11, the photographic lens 2 is rotated slightly in the clockwise direction as viewed in the figure, then the area of the portion where the rear surface 213 of the first accessory side claw 210 abuts against the front surface 113 of the first body side claw 110 and the area of the portion where the rear surface 233 of the third accessory side claw 230 abuts against the front surface 133 of the third body side claw 130 both increase.

Accordingly, the situation shown in FIG. 11, in which the rear surface 213 of the first accessory side claw 210 abuts against the front surface 113 of the first body side claw 110 and the rear surface 233 of the third accessory side claw 230 abuts against the front surface 133 of the third body side claw 130, shows the case in which the area of the abutting portions becomes the smallest, when the abutting locations are only these two locations. At the installation and detachment rotational phase as shown in FIG. 11, the abutting portion between the rear surface 213 of the first accessory side claw 210 and the front surface 113 of the first body side claw 110 covers 11° when expressed as an angular range viewed from the front of the camera body 1.

As will be described hereinafter, it should be understood that there are also other states in which the accessory side mount 200 is prevented from being inserted into the body side mount 100 by two of the body side claws 110 through 130 abutting against two of the accessory side claws 210 through 230 at a total of two locations. However, in a state in which the accessory side mount 200 is prevented from being inserted into the body side mount 100 by two of the body side claws 110 through 130 abutting against two of the accessory side claws 210 through 230 at a total of two locations, to consider that abutting location among the two abutting locations whose abutting area is smaller: there are two states for which this abutting area is minimal: the state shown in FIG. 11, and, as will now be described, a state (not shown in the figures) in which the photographic lens 2 has been rotated through 11° in the anticlockwise direction as viewed in the figure from the state shown in FIG. 11.

In this state in which the photographic lens 2 has been rotated through 11° in the anticlockwise direction as viewed in the figure from the state shown in FIG. 11, instead of the rear surface 213 of the first accessory side claw 210 and the front surface 113 of the first body side claw 110 abutting one another, the rear surface 213 of the first accessory side claw 210 and the front surface 123 of the second body side claw 120 abut against one another. It should be understood that this further one abutting location is the location where the rear surface 233 of the third accessory side claw 230 abuts the front surface 133 of the third body side claw 130. Similarly to the case in FIG. 11, the abutting portion between the rear surface 213 of the first accessory side claw 210 and the front surface 123 of the second body side claw 120 covers 11° when expressed as an angular range with the camera mount 100 being viewed from the front of the camera body 1.

In other words, in this case as well, the total number of abutting locations between the body side claws 110 through 130 and the accessory side claws 210 through 230 is two locations. The area of the abutting portions when the number of abutting locations is two is minimal in this state in which the rear surface 213 of the first accessory side claw 210 and the front surface 123 of the second body side claw 120 abut one another, and the rear surface 233 of the third accessory side claw 230 and the front surface 133 of the third body side claw 130 abut one another.

In other words, the area of the abutting portion between the rear surface 213 of the first accessory side claw 210 and the front surface 113 of the first body side claw 110 shown in FIG. 11 is the smallest area in any state in which insertion of the accessory side mount 200 into the body side mount 100 is prohibited by two of the body side claws 110 through 130 and two of the accessory side claws 210 through 230 abutting one another at a total of two locations. In a similar manner, in the state in which, from the state shown in FIG. 11, the photographic lens 2 has been rotated through 11° in the anticlockwise direction as viewed in the figure, the area of the abutting portion between the rear surface 213 of the first accessory side claw 210 and the front surface 123 of the second body side claw 120 is the smallest area in any state in which insertion of the accessory side mount 200 into the body side mount 100 is prohibited by two of the body side claws 110 through 130 and two of the accessory side claws 210 through 230 abutting one another at a total of two locations. The installation and detachment rotational phase shown in FIG. 11, and the installation and detachment rotational phase in the state in which, from the state shown in FIG. 11, the photographic lens 2 has been rotated through 11° in the anticlockwise direction as viewed in the figure, will be termed the "specified installation and detachment rotational phases".

As described above, when from the state shown in FIG. 11 the photographic lens 2 is rotated in the anticlockwise direction as viewed in the figure, the rear surface 213 of the first accessory side claw 210 abuts against the front surface 113 of the first body side claw 110 and against the front surface 123 of the second body side claw 120, and the rear surface 233 of the third accessory side claw 230 abuts against the front surface 133 of the third body side claw 130. In other words, the total number of abutting locations between the body side claws 110 through 130 and the accessory side claws 210 through 230 is three locations.

And, when the photographic lens 2 is further rotated in the anticlockwise direction as viewed in the figure, at the time point that, as described above, the photographic lens 2 has been rotated through 11° in the anticlockwise direction as viewed in the figure from the state shown in FIG. 11, since the rear surface 213 of the first accessory side claw 210 ceases to abut against the front surface 113 of the first body side claw 110, accordingly the total number of abutting locations between the body side claws 110 through 130 and the accessory side claws 210 through 230 now is two locations.

Figure 12:
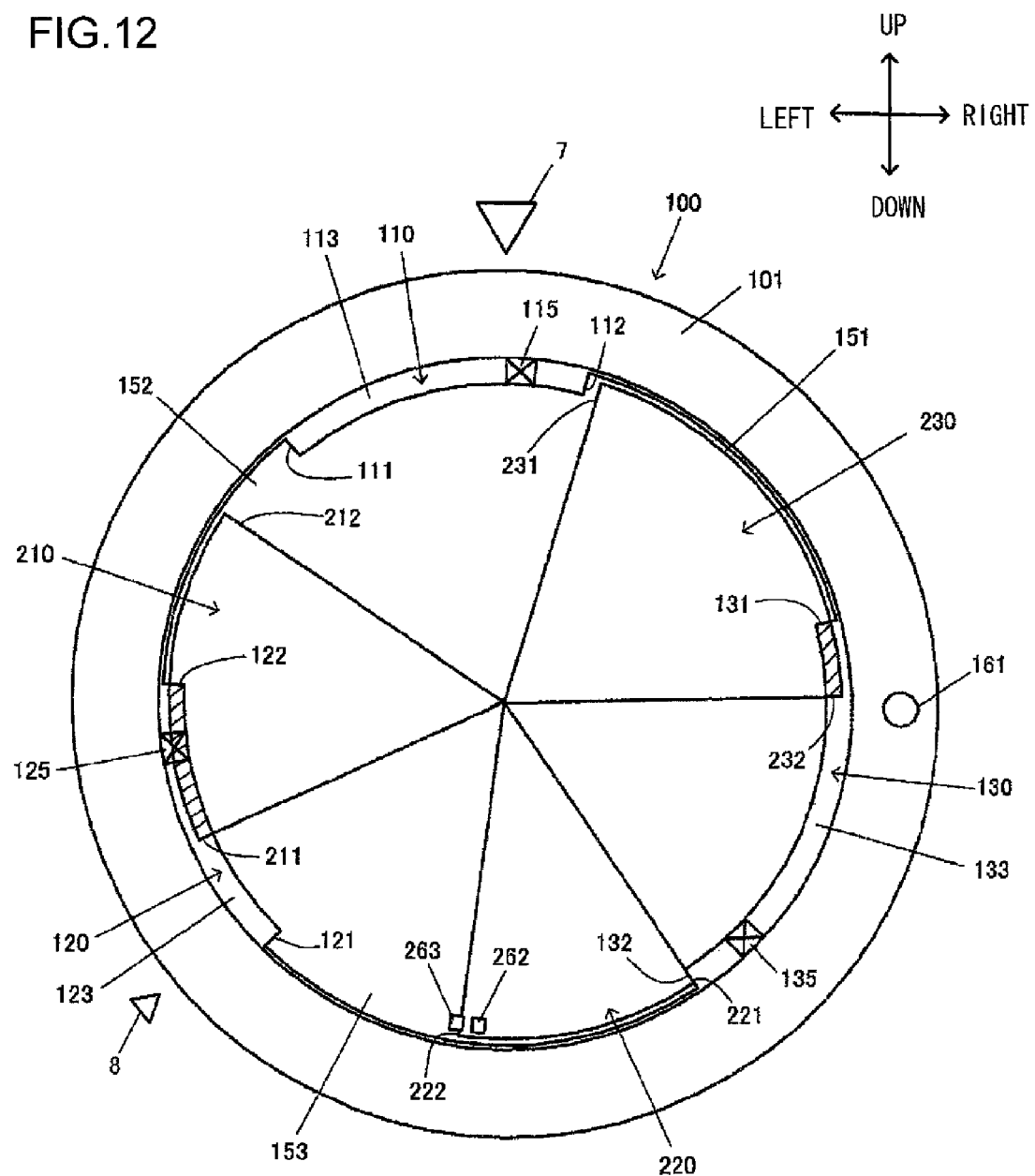
FIG. 12 is another figure showing whether or not any interference (i.e. an overlapping state) is taking place between the body side claws and the accessory side claws.

If the photographic lens 2 is rotated further in the anticlockwise direction as viewed in the figure, then the state shown in FIG. 12 is established.

As can be clearly understood from FIG. 12, when, from the state shown in FIG. 12, the photographic lens 2 is slightly rotated in the anticlockwise direction as viewed in the figure, then the rear surface 223 of the second accessory side claw 220 comes to abut against the front surface 133 of the third body side claw 130. In other words, the total number of abutting locations between the body side claws 110 through 130 and the accessory side claws 210 through 230 now becomes three locations. And when, from this state, the photographic lens 2 is yet further rotated in the anticlockwise direction as viewed in the figure, then the rear surface 233 of the third accessory side claw 230 comes to abut against the front surface 113 of the first body side claw 110. In other words, the total number of abutting locations between the body side claws 110 through 130 and the accessory side claws 210 through 230 now becomes four locations.

And, when the photographic lens 2 is further rotated in the anticlockwise direction as viewed in the figure, then the rear surface 233 of the third accessory side claw 230 ceases to abut against the front surface 133 of the third body side claw 130, and, subsequently, the rear surface 213 of the first accessory side claw 210 ceases to abut against the front surface 123 of the second body side claw 120. In other words, as shown in FIG. 13, the total number of abutting locations between the body side claws 110 through 130 and the accessory side claws 210 through 230 now becomes two locations.

Figure 13:
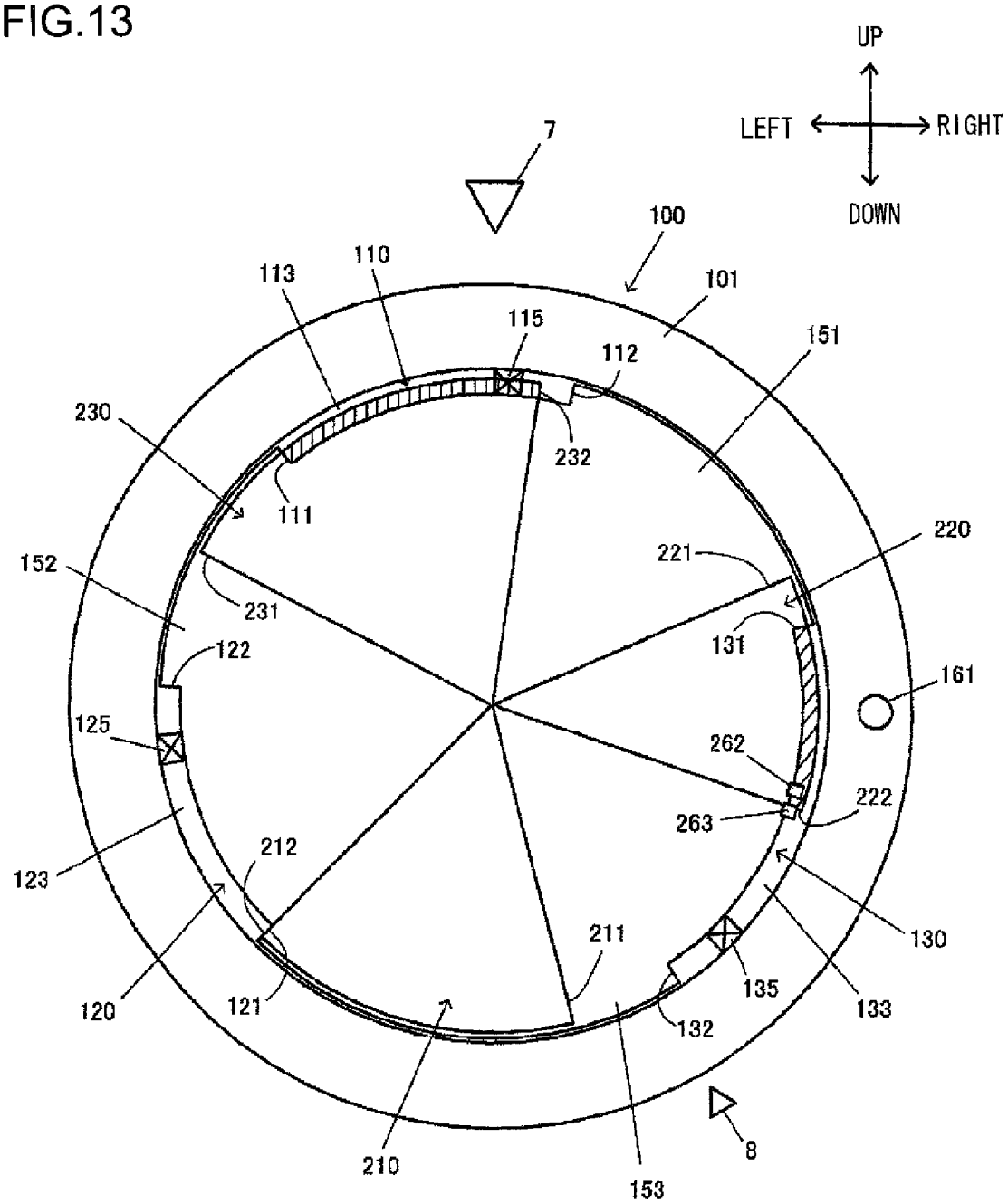
FIG. 13 is a further figure showing whether or not any interference (i.e. an overlapping state) is taking place between the body side claws and the accessory side claws.

Moreover when, from the state shown in FIG. 13, the photographic lens 2 is yet further rotated in the anticlockwise direction as viewed in the figure, then the area of the abutting portion between the rear surface 223 of the second accessory side claw 220 and the front surface 133 of the third body side claw 130, and the area of the abutting portion between the rear surface 233 of the third accessory side claw 230 and the front surface 113 of the first body side claw 110 both decrease. Accordingly, the state shown in FIG. 13 shows the case in which the area of the abutting portions is greatest, when the rear surface 223 of the second accessory side claw 220 and the front surface 133 of the third body side claw 130 are abutting one another and also the rear surface 233 of the third accessory side claw 230 and the front surface 113 of the first body side claw 110 are abutting one another, so that the total number of abutting locations is two.

Figure 14:
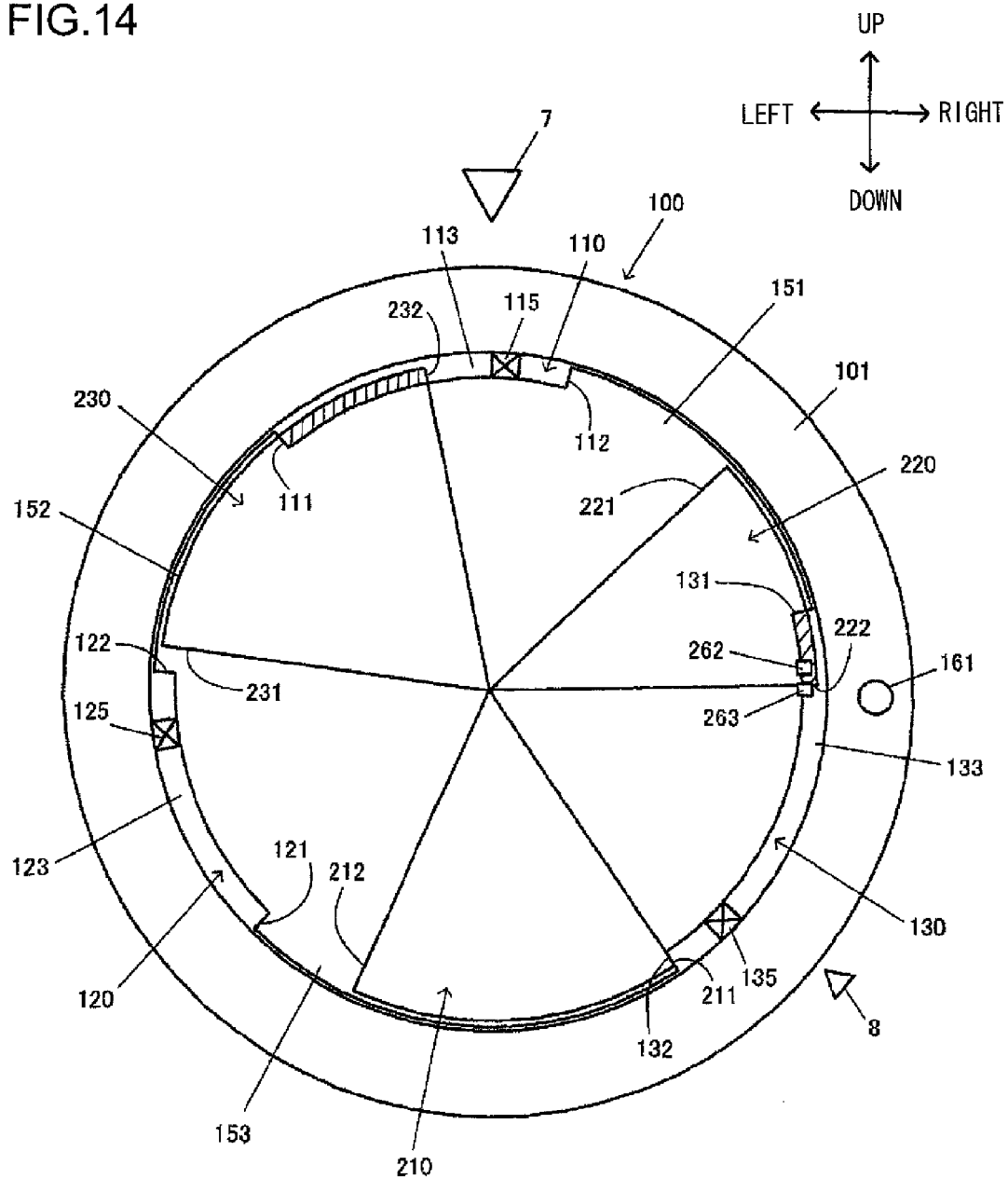
FIG. 14 is still another figure showing whether or not any interference (i.e. an overlapping state) is taking place between the body side claws and the accessory side claws.

FIG. 14 shows a state in which, from the state shown in FIG. 13, the photographic lens 2 has been still further rotated in the anticlockwise direction as viewed in the figure, and shows the case in which the area of the abutting portions is smallest, when the rear surface 223 of the second accessory side claw 220 and the front surface 133 of the third body side claw 130 are abutting one another and also the rear surface 233 of the third accessory side claw 230 and the front surface 113 of the first body side claw 110 are abutting one another, so that the total number of abutting locations is two.

And when, from the state shown in FIG. 14, the photographic lens 2 is slightly rotated in the anticlockwise direction as viewed in the figure, now the rear surface 213 of the first accessory side claw 210 comes to abut against the front surface 133 of the third body side claw 130. At this time, the total number of abutting locations between the body side claws 110 through 130 and the accessory side claws 210 through 230 now becomes three locations. And when, from this state, the photographic lens 2 is yet further rotated in the anticlockwise direction as viewed in the figure, then the rear surface 233 of the third accessory side claw 230 comes to abut against the front surface 123 of the second body side claw 120. At this time, the total number of abutting locations between the body side claws 110 through 130 and the accessory side claws 210 through 230 now becomes four locations.

Figure 15:
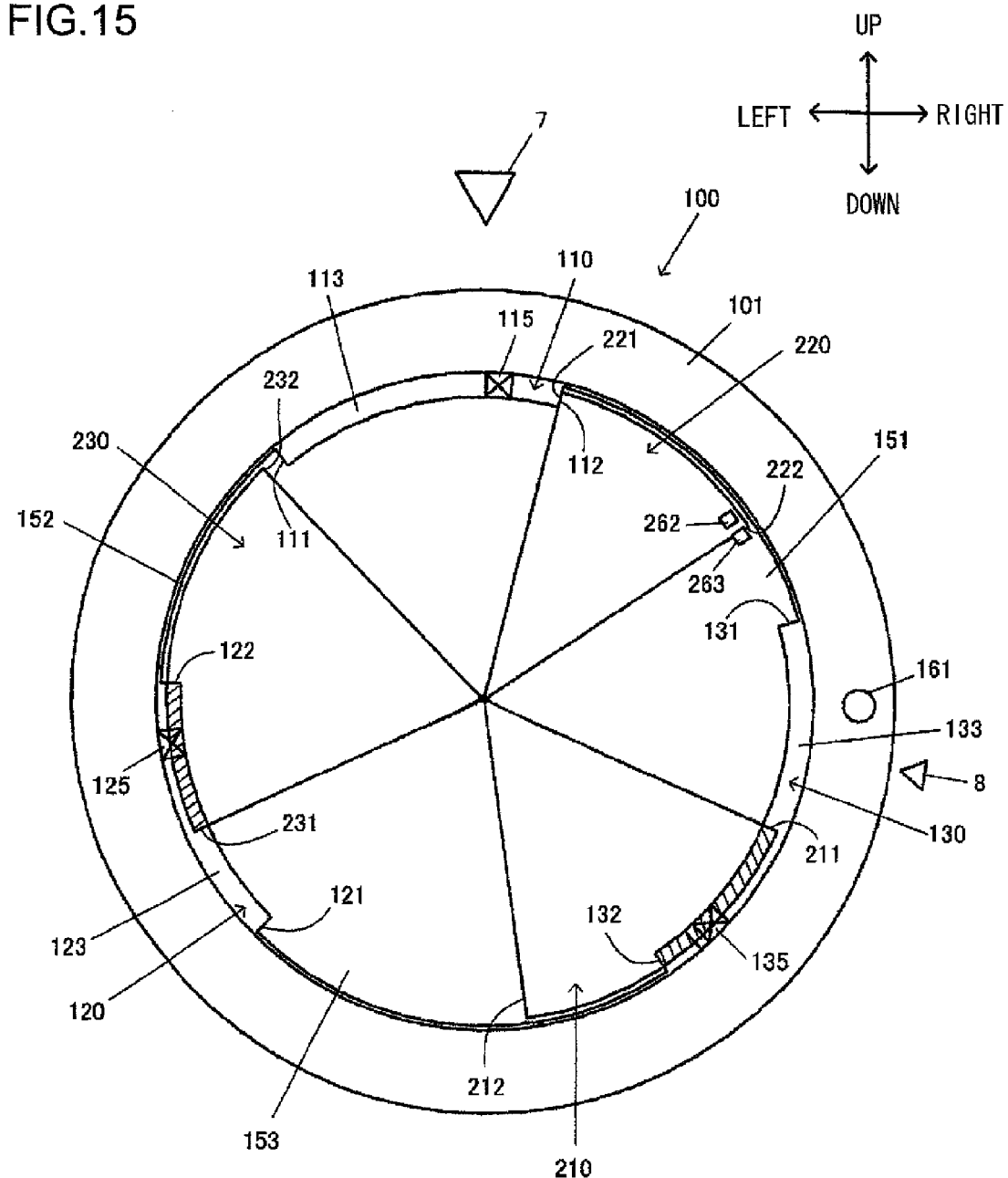
FIG. 15 is yet another figure showing whether or not any interference (i.e. an overlapping state) is taking place between the body side claws and the accessory side claws.

When, from this state, the photographic lens 2 is further rotated in the anticlockwise direction as viewed in the figure, then the rear surface 223 of the second accessory side claw 220 and the front surface 133 of the third body side claw 130 cease to abut against one another. At this time, the total number of abutting locations between the body side claws 110 through 130 and the accessory side claws 210 through 230 now becomes three locations. And when, from this state, the photographic lens 2 is further rotated in the anticlockwise direction as viewed in the figure, then the rear surface 233 of the third accessory side claw 230 and the front surface 113 of the first body side claw 110 cease to abut against one another, as shown in FIG. 15. At this time, the total number of abutting locations between the body side claws 110 through 130 and the accessory side claws 210 through 230 now becomes two locations.

Moreover when, from the state shown in FIG. 15, the photographic lens 2 is slightly rotated in the anticlockwise direction as viewed in the figure, now the rear surface 223 of the second accessory side claw 220 comes to abut against the front surface 113 of the first body side claw 110. At this time, the total number of abutting locations between the body side claws 110 through 130 and the accessory side claws 210 through 230 now becomes three locations. And when the photographic lens 2 is further rotated in the anticlockwise direction as viewed in the figure, the system returns to the proper installation and detachment rotational phase shown in FIG. 7, in which there is no abutting (i.e. no interference) between the body side claws 110 through 130 and the accessory side claws 210 through 230.

—Concerning the Feature that the Limit Members 262 and 263 are Provided in Front of the Second Accessory Side Claw 220—

Here, as previously described, "in front of" means "towards the photographic subject", or, to put it in another manner, "toward the direction from which light from the photographic subject is incident".

While, in this embodiment, the limit members 262 and 263 are provided in front of the second accessory side claw 220, in this case, operation as described below may be anticipated.

(1) Among the three accessory side claws 210, 220, and 230, the second accessory side claw 220 is the one whose angular length around the circumferential direction of the accessory side mount 200 is the shortest. To put this in another manner, among the three claws listed above, it is the second accessory side claw 220 whose circular arc length is the shortest. Due to this, when operation to install the interchangeable lens 2 in the proper installation and detachment rotational phase is to be performed, the interchangeable lens 2 can be installed to the camera body 1 by rotationally actuating the lens by only an amount equal to the circular arc length of this second accessory claw 220. Also, in a similar manner, when the operation of detaching the interchangeable lens 2 from the camera body 1 is to be performed, it is possible to detach the interchangeable lens 2 from the camera body 1 by rotationally actuating the interchangeable lens 2 (in the opposite rotational direction to the direction in which it was actuated during installation) by only an amount equal to the circular arc length of this second accessory claw 220. In other words, by providing the limit members 262 and 263 in front of the second accessory side claw 220, it is possible to reduce the amount of rotational actuation of the accessory by the user during installation and during detachment. Due to this, it is possible to reduce the burden of the rotational actuation demanded from the user during installation and during detachment of the accessory (i.e. of the interchangeable lens 2). Moreover, it is also possible to shorten the time period required for installation and for detachment of the accessory (i.e. of the interchangeable lens 2).

(2) By providing the limit members 262 and 263 in front of the second claw 220, the advantage is obtained that it is possible to use other structures for limiting the rotational actuation of the accessory (i.e. of the interchangeable lens 2) during installation and detachment of the accessory (i.e. of the interchangeable lens 2), in other words that it is possible to use "end portions" (i.e. the end portions of the body claws) that are present in positions where it is comparatively difficult for them to experience damage during use, with these body side claw end portions serving as opposing members (i.e. as force reception members) that limit the above rotation by physically contacting the limit members 262 and 263.

Further explanation of the above now follows. During installation of the photographic lens 2 (in the proper installation and detachment rotational phase), the second accessory side claw 220, in front of which the limit members 262 and 263 are provided, is passed through the second body side cutaway 152, whose angular range around the edge of the circular aperture in the camera body 1 is the narrowest. This angular range of the second body side cutaway 152 around the edge of the circular aperture in the camera body 1 is 47.5°. Due to this, neither the first accessory side claw 210 (whose angular range is 58.5°) nor the third accessory side claw 230 (whose angular range is 71.5°), that have angular ranges greater than this angular range (47.5°, can pass through here. Accordingly it is difficult for any damage to take place to the first end surface 111 of the first body side claw 110 or to the second end surface 122 of the second body side claw 120, these being the surfaces that limit the angular range of the second body side cutaway 152, since, in any phase other than the proper installation and detachment rotational phase, there is little danger that either the first accessory side claw 210 or the third accessory side claw 230 can be inserted into the second body side cutaway 152.

Now, supposing that it were easy for damage to take place to the first end surface 111 of the first body side claw 110 and to the second end surface 122 of the second body side claw 120, inconveniences of the following type would occur.

As described above, when the photographic lens 2 that has been installed is to be removed from the camera body 1, the first end surface 111 of the first body side claw 110 abuts against the detachment side limit member 263, and prevents the photographic lens 2 from rotating any further in the detachment direction than is necessary. Due to this, if this first end surface 111 of the first body side claw 110 has suffered some damage or the like, then the photographic lens 2 may rotate further than necessary in the detachment direction. In this case, it may undesirably become impossible to remove the photographic lens 2 from the camera body, due to the second end surface 212 of the first accessory side claw 210 entering behind the third body side claw 130, or due to the second end surface 232 of the third accessory side claw 230 entering behind the second body side claw 120.

As described above, when the photographic lens 2 is being installed to the camera body 1 with the lens install/detach button not shown in the figures being kept continuously pressed, the second end surface 122 of the second body side claw 120 abuts against the installation side limit member 262, and prevents the photographic lens 2 from rotating any further in the installation direction than is necessary. Now, when the photographic lens 2 is being installed to the camera body 1 with the lens install/detach button not shown in the figures being kept continuously pressed, and when the photographic lens 2 is rotated in the installation direction until the installation side limit member 262 abuts against the second end surface 122 of the second body side claw 120, let us suppose that the position of the lens install/detach lock pin 9 and the position of the pin hole 261 in the accessory side mount 200 are slightly different. In this case, however, since the end of the lens install/detach lock pin 9 is formed as being rounded over, if the amount of this deviation of the position of the pin hole 261 is small, then, when the user releases the lens install/detach button, due to the biasing force of a spring not shown in the figures, and when the lens install/detach lock pin 9 tries to enter the pin hole 261, the accessory side mount 200, that had been rotated more than necessary in the installation direction, will be returned to its correct rotational phase. Or, when the user releases the lens install/detach button and returns the photographic lens 2 slightly, the lens install/detach lock pin 9 will enter into the pin hole 261, and the accessory side mount 200 will be set to its correct rotational phase.

However, if damage or the like has occurred to the second end surface 122 of the second body side claw, then, when the photographic lens 2 is being installed to the camera body 1 with the lens install/detach button not shown in the figures being kept continuously pressed, there may be a relatively large deviation between the position of the lens install/detach lock pin 9 and the position of the pin hole 261 in the accessory side mount 200. In this type of case, even if the user releases the lens install/detach button, since the lens install/detach lock pin 9 does not enter into the pin hole 261, accordingly the accessory side mount 200 that has rotated further than necessary in the installation direction does not return to the correct rotational phase. Due to this, an inconvenience may occur such as it becoming impossible to perform photography or the like, due to sets of electrical contact points not shown in the figures for transmitting and receiving signals between the photographic lens 2 and the camera body 1 not making proper contact with one another.

However since, in this embodiment, as described above, it is difficult for damage to occur to the first end surface 111 of the first body side claw 110 and to the second end surface 122 of the second body side claw 120, accordingly it is difficult for the inconveniences described above to occur, so that it is possible to supply a camera system whose reliability is high.

—Concerning the Third Accessory Side Claw 230—

As described above, on the third accessory side claw 230, in the neighborhood of its first end surface 231, its front surface 234 is pressed by the spring 136 of the third body side claw 130, and, if an excessively great external forces acts, its front surface 234 is abutted against the abutting portion 135. In other words, when the photographic lens 2 is being installed to the camera body 1, on the accessory side claw 230, the force that is used for fixing the photographic lens 2 to the camera body 1 acts principally in the neighborhood of its first end surface 231.

—Concerning the First Body Side Claw 110—

When the total number of locations where the body side claws 110 through 130 and the accessory side claws 210 through 230 abut one another is two locations, if one of those locations is upon the first body side claw 110, then, as shown in FIGS. 11, 13, and 14, the location where the first body side claw 110 abuts the accessory side claws 210 through 230, necessarily, is not located towards its second end surface 112 (in other words upon its front surface 113 in the neighborhood of its second end surface 112), but rather is located towards its first end surface 111 (in other words, is located upon its front surface 113 in the neighborhood of its first end surface 111). In other words, when the total number of locations where the body side claws 110 through 130 and the accessory side claws 210 through 230 abut one another is two locations, if one of those locations is upon the first body side claw 110, then, without any mistake, the function of blocking erroneous insertion is exercised by the portion of the first body side claw 110 that is in the neighborhood of its first end surface 111.

And the spring 116 is provided adjacent to the abutting portion 115, in the neighborhood of the second end surface 112 of the first body side claw 110. In other words, when the photographic lens 2 is installed to the camera body 1, the neighborhood of the second end surface 112 of the first body side claw 110 serves the function of fixing the photographic lens 2 to the camera body 1.

In this way, with this structure, these functions are apportioned to the neighborhood of the first end surface 111 and the neighborhood of the second end surface 112, along the direction of extension of the first body side claw 110.

With the photographic lens 2 of this embodiment having this structure, the following beneficial operational effects are obtained.

(1) The photographic lens 2 is a camera accessory that can be detachably fitted to the camera body 1 that includes the camera body side mount 100, and that moreover includes the accessory side mount 200 having a bayonet construction and comprising the first through third claws 210 through 230 that are mutually separated around the circumferential direction of a circle with a predetermined diameter, and that are provided to project in the radial direction from the circumference. When the accessory side mount 200 has been inserted into the camera body side mount 100 in the proper installation and detachment rotational phase, each of the first through third claws 210 through 230 is permitted to be inserted into the camera body side mount 100 without being hampered by the three camera body side claws 110 through 130 that are provided to the camera body side mount 100. The accessory side mount 200 comprises at least the first limiting portion 262 and the second limiting portion 263 that is different from the first limiting portion 262. When, in order to install the accessory side mount 200 that has been inserted in the proper installation and detachment rotational phase into the body side mount 100, the first through third claws 210 through 230 are rotated in a first rotational direction along the circumferential direction, the first limiting portion 262 limits the range of rotation in the first rotational direction by abutting an end surface of one of the camera body side claws. And when, in order to detach the accessory side mount 200 from the body side mount 100, the first through third claws 210 through 230 are rotated in a second rotational direction along the circumferential direction that is opposite to the first rotational direction, the second limiting portion 263 limits the range of rotation in the second rotational direction by abutting an end surface of one of the camera body side claws. In concrete terms, the structure is arranged so that, both during installation and during detachment of the photographic lens 2, different limit members abut against a claw upon the body side. Due to this, the durability of the limit members 262 and 263 is enhanced. Moreover since, with these limit members 262 and 263, the load that acts upon the limit members 262 and 263 when they are abutted against the claw on the body side is a so called one way pulsating load, accordingly, if the limit members 262 and 263 are both pins with heads that are screwed into the accessory side mount 200 from the outward radial direction, then it is difficult for them to become loose, so that it is possible to suppress malfunctioning due to the limit members 262 and 263 becoming loosened.

(2) In this embodiment, the limit members 262 and 263 are provided in the front of the second accessory side claw 220 (i.e. towards the side of the photographic subject, or, to put it in another manner, on the side from which the light from the photographic subject is incident) whose angular length extending along the circumferential direction of the accessory side mount 200 is the shortest (i.e. whose circular arc length is the shortest). According to this structure, during installation of the accessory and during detachment thereof, it is possible to reduce the amount of rotation of the accessory by the user. And, due to this, it is possible to reduce the burden of rotation that is required from the user during installation of the accessory and during detachment thereof. Moreover, it is also possible to shorten the time period that is required for installation and removal of the accessory.

(3) In this embodiment, by providing the limit members 262 and 263 in front of the second claw 220, it is possible to provide a system that employs different structures for limiting the rotational actuation of the accessory during installation of the accessory and during detachment thereof; in other words, that employs "end portions" (i.e. end portions of the body claws) that are present in positions where it is comparatively difficult for them to experience damage during use, with these body side claw end portions serving as opposing members (i.e. force reception members) that limit the above rotation by physically contacting the limit members 262 and 263. Due to this, it is possible to provide a structure for implementing limitation of the rotation that is comparatively durable, so that, as a result, the durability of this mount having a bayonet construction can be enhanced.

To put this in another manner, by providing this structure in which the angular range of the second body side cutaway 152 along the border of the circular aperture in the camera body 1 is narrower than that of the other body side cutaways 151 and 153, it becomes impossible for the first accessory side claw 210 or the third accessory side claw 230 to enter into the second body side cutaway 152 in any rotational phase other than the proper installation and detachment rotational phase, so that, as described above, it is possible to enhance the durability of this mount having a bayonet construction.

(4) If the three accessory side claws 210 through 230 were to be made of the same size and were arranged at regular intervals, and also the three body side claws 110 through 130 were to be made of the same size and were arranged at regular intervals, this being undesirable, then it would be possible for the photographic lens 2 to be installed to the camera body 1 in one or more rotational phases other than the proper installation and detachment rotational phase, and this would be very undesirable. Due to this, along with varying the sizes of the three accessory side claws 210 through 230, also the intervals at which they are disposed are varied; and, along with varying the sizes of the three body side claws 110 through 130, also the intervals at which they are disposed are varied. Moreover the above structure is provided in which, if an attempt is made to insert the photographic lens 2 in any rotational phase other than the proper installation and detachment rotational phase, at least two of the body side claws 110 through 130 abut against at least two of the accessory side claws 210 through 230 in a total number of at least two locations, so that insertion of the accessory side mount 200 into the body side mount 100 is positively prevented. If, for example, the number of locations where a claw of the mount of the camera accessory and a claw of the mount of the camera body abutted against one another were to be only one location, then there would be a danger that the two other claws on the accessory side that were not abutting anything might enter in between claws on the camera body side, and this would be undesirable. However, in this embodiment, it is possible reliably to prevent erroneous installation of the camera accessory, since, in any rotational phase other than the proper installation and detachment rotational phase, the number of abutting locations between the body side claws 110 through 130 and the accessory side claws 210 through 230 is two locations or more, as described above.

(5) In this structure, it is arranged for the limit members 262 and 263 to abut the second end surface 122 of the second body side claw 120 and the first end surface 111 of the first body side claw 110 respectively, and for them to limit the ranges of rotation of the photographic lens 2 in the installation direction and in the detachment direction respectively. Since, due to this, it is possible to limit the ranges of rotation of the photographic lens 2 in both the installation direction and in the detachment direction with a simple structure, accordingly it is possible to keep down the manufacturing cost of the body side mount 100 and of the accessory side mount 200.

(6) Due to the influence of the weight of the photographic lens 2, the photographic lens 2 can easily sag down with respect to the camera body 1 at its front end (its end towards the photographic subject), but, in the normal state, the accessory side mount reference surface 201 is kept in the state of abutting against the body side reference surface 101, due to the biasing force of the springs 116, 126, and 136. However in a photographic state in which the camera body 1 is fixed to a tripod, for example, if an external force acts in the same direction as gravity, and this external force creates a situation in which the total force is greater than the biasing force of the springs, then, if for example the camera body 1 is in the normal or horizontal orientation, the spring 116 of the body side claw 110 that is uppermost will deflect further, and the front surface 214 of the first accessory side claw 210 will start to abut against the abutting portion 115 of the first body side claw 110.

Figure 16:
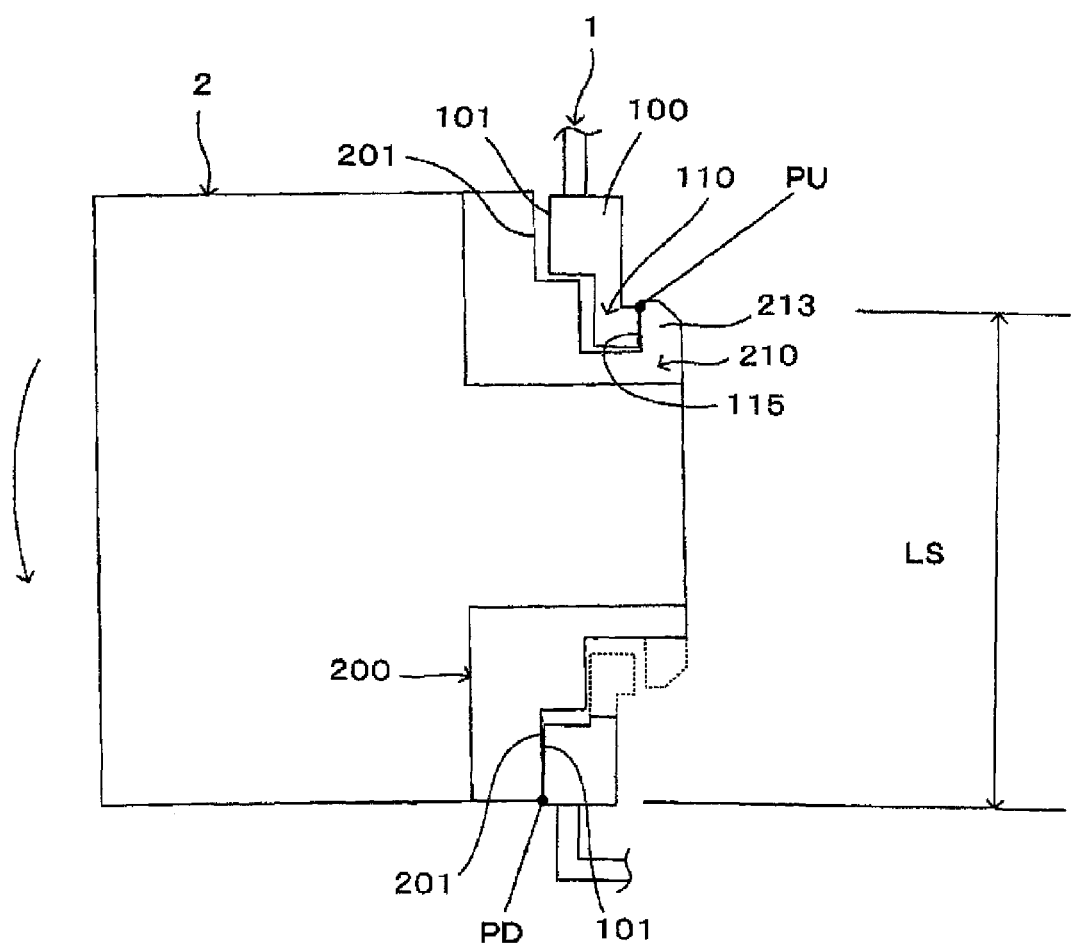
FIG. 16 is a figure for explanation of the relationship between the body side mount and the accessory side mount, when an excessively great external force in the same direction as gravity acts upon the photographic lens.

This state is shown in FIG. 16. It should be understood that, in FIG. 16, for the convenience of explanation, the gaps between the various parts and so on are exaggerated. In this state, the accessory side mount reference surface 201 and the body side mount reference surface 101 are in contact at a point PD at the lower side, and at the upper side, as described above, the front surface 214 of the first accessory side claw 210 and the abutting portion 115 of the first body side claw 110 are in contact at a point PU, so that the weight of the photographic lens 2 and the external force are sustained at these two points. Accordingly, it is possible to reduce the forces acting upon these two points PD and PU by making the distance LS between these two points PD and PU in the vertical direction (i.e. in the direction in which gravity acts) be as long as possible.

This type of situation does not happen during the normal photographic state unless some unintended external force acts. However, when it is considered that the photographic lens 2 is generally of a tubular shape and can easily be touched by a person or an object, and that it can also be used under various different conditions, it must be supposed that this can happen fairly often, and therefore it is necessary also to take account of the possibility of this situation.

Figure 17:
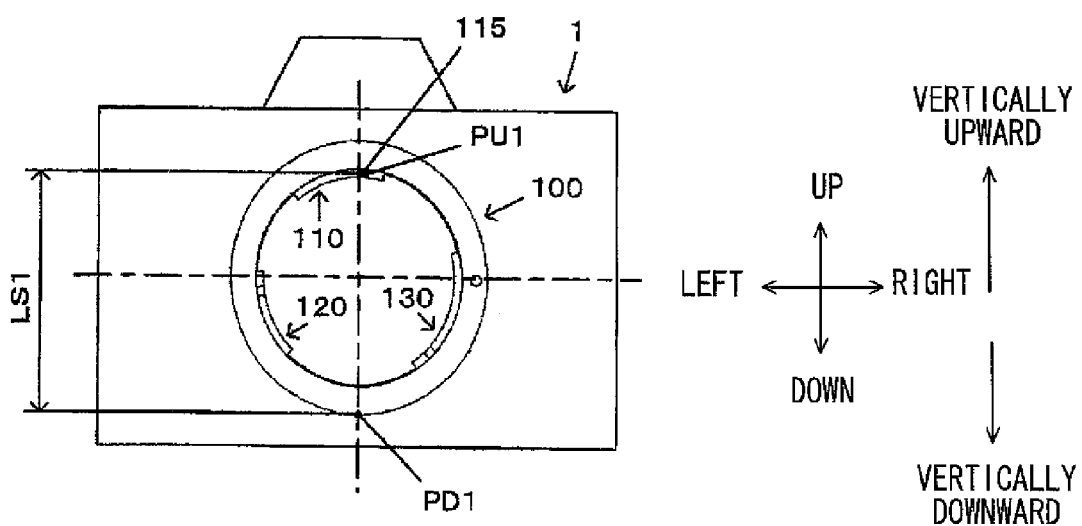
FIG. 17 is a figure for explanation of contact points PD and PU and a distance LS, when the attitude of the camera body is the horizontal position.

The contact points PD and PU and the distance LS when the camera body is in various different attitudes are shown in FIGS. 17 through 19. It should be understood that, in FIG. 17, the attitude of the camera body is the normal orientation (i.e. the horizontal position), and, at that time, the distance LS is denoted by LS1, while the contact points are denoted by PD1 and PU1 respectively. Moreover, in FIG. 18 the attitude of the camera body is the vertical position with its left side upward, and, at that time, the distance LS is denoted by LS2, while the contact points are denoted by PD2 and PU2 respectively. Furthermore, in FIG. 19 the attitude of the camera body is the vertical position with its right side upward, and, at that time, the distance LS is denoted by LS3, while the contact points are denoted by PD3 and PU3 respectively. The distance LS1 in the horizontal position shown in FIG. 17 and the distance LS2 in the vertical position shown in FIG. 18 are both approximately equal to the diameter of the body side mount 100. However, the distance LS3 in the vertical position shown in FIG. 19 is shorter than the distance LS1 or LS2.

Due to this, if the external forces to which the photographic lens 2 is subjected are equal, the force that acts upon PU3 is greater than those acting upon PU1 and PU2.

Thus, in this embodiment, the length of the third body side claw 130 in the circumferential direction is made to be longer than the lengths of the first body side claw 110 and the second body side claw 120. Due to this, the strength of the third body side claw 130 is also greater than the strengths of the first body side claw 110 and the second body side claw 120. Moreover, the length in the circumferential direction of the third accessory side claw 230 of the accessory side mount 200, that is in contact with the abutting portion 135 in the state in which installation of the photographic lens 2 has been completed (i.e. that is in contact at the point PU3) is also made to be longer than the lengths of the first accessory side claw 210 and the second accessory side claw 220. Thus, since sufficient strength for the third body side claw 130 and third accessory side claw 230 is ensured, accordingly, even when the attitude of the camera body 1 is the vertically positioned state shown in FIG. 19, still malfunctioning of the third body side claw 130 and third accessory side claw 230 does not occur, even though they are subjected to the greatest burden.

In this manner, according to this embodiment, it is possible to obtain both the beneficial effect that erroneous insertion in any rotational phase other than the proper installation and detachment rotational phase is reliably prevented, and also the beneficial effect that the strength of the accessory side mount 200 and the body side mount 100 is ensured in the state in which the photographic lens 2 has been installed to the camera body 1 by being inserted thereinto in the proper installation and detachment rotational phase.

(7) As described above, this structure provides for apportionment of this function between the neighborhood of the first end surface 111 and the neighborhood of the second end surface 112 along the extension direction of the first body side claw 110. Due to this, the durability of the first body side claw 110 is enhanced. In particular, the first body side claw 110 is the claw upon which, in the horizontal position of the camera body 1 that is frequently employed, the spring 116, to which a more constant burden is applied than to the other springs 126 and 136 due to the imposition of the weight of the photographic lens 2, and the above described point PU1 act, and is the claw to which a high loading is most frequently applied. As a consequence, by enhancing the durability of this first body side claw 110 upon which a heavy burden is most frequently imposed, the durability and the reliability of the body side mount 100 itself are also enhanced.

(8) Since, in this embodiment, it is arranged for the abutting portion 115 to be located approximately at the top of the body side mount 100, accordingly it is possible to make the above described distance LS1 long. Since, due to this, it is possible to reduce the force acting upon the contact point PU, accordingly the durability of the first body side claw 110 is enhanced. Moreover, it is possible effectively to suppress sagging down of the front of the photographic lens 2 with respect to the camera body 1. Furthermore, since the body side claw 110 is provided so as to extend over the top of the body side mount 100, accordingly it is possible to ensure sufficient strength for the abutting portion 115, so that the durability of the first body side claw 110 is enhanced. Accordingly, the durability and the reliability of the body side mount 100 itself are enhanced.

(9) As shown by the dotted lines in FIG. 16, the rear surfaces of the body side claws 110 through 113 and the front surfaces of the accessory side claws 210 through 230 located at the lower region are less likely to come into contact with one another. Due to this, the need to make the body side claws 110 through 113 and the accessory side claws 210 through 230 abut against one another at the lower region is low. Thus, in this embodiment, it is arranged for the third body side cutaway 153, that is the largest one, to be positioned at the bottom of the body side mount 100, as for example shown in FIG. 5. Accordingly, it is possible to arrange the body side claws 110 through 130 in a logical manner.

(10) The accessory side claws 210 through 230 are arranged at positions as shown in FIG. 6, and this is done for the following reasons. It is desirable for the strength of the first accessory side claw 210, that is the claw that is positioned directly on the top when the photographic lens 2 is installed to the camera body that is in the horizontal position, to be the highest, and accordingly the angular length through which it extends along the circumferential direction ought to be the longest. However since, as described above, in this structure, it is arranged for the third body side cutaway 153, that is the largest one, to be positioned at the bottom of the body side mount 100, accordingly the length in the circumferential direction of the third accessory side claw 230, that passes through the third body side cutaway 153 during insertion in the proper installation and detachment rotational phase, is the longest. Thus, it is arranged for the length along the circumferential direction of the first accessory side claw 210 to be made the second longest. And it is arranged for the second accessory side claw 220, for which there are fewer limitations such as the above, to extend along the circumferential direction for the shortest length. By providing the accessory side claws 210 through 230 like this, it is possible to arrange the accessory side claws 210 through 230 in a logical manner.

Variant Embodiments (1) While, in the explanation of the structure given above, it was arranged for the accessory side claws 210 through 230 to be fixed with respect to the main body of the photographic lens 2, and for the photographic lens 2 itself to be rotated in the installation direction or in the detachment direction with respect to the camera body 1 during installation or detachment of the photographic lens 2, the present invention is not to be considered as being limited to this configuration. For example, it would also be possible to provide a structure in which the accessory side claws 210 through 230 are made to be rotatable with respect to the main body of the photographic lens 2, and with which, after having inserted the photographic lens 2 in the proper installation and detachment rotational phase, it is possible to install the photographic lens 2 to the camera body 1 by rotating only the accessory side claws 210 through 230.

Figure 20A:
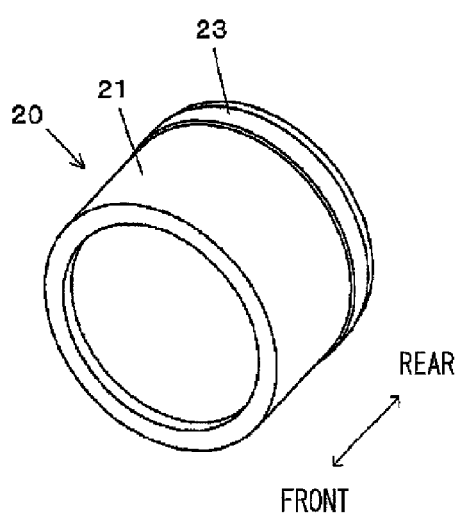
FIGS. 20A and 20B are figures showing a variant example of the embodiment of the present invention.
Figure 20B:
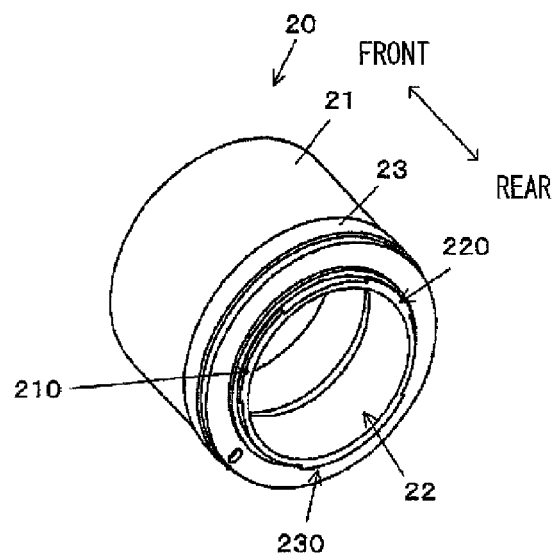

FIGS. 20A and 20B are figures showing the external appearance of an example of such a photographic lens 20 in which the accessory side claws 210 through 230 are made to be rotatable with respect to the main body of the photographic lens 2. The photographic lens 20 comprises a lens barrel 21, a bayonet barrel 22 having accessory side claws 210 through 230 that is provided so as to be rotatable with respect to the lens barrel 21, and an actuation ring 23 for making the bayonet barrel 22 rotate with respect to the lens barrel 21. It should be understood that, in FIGS. 20A and 20B and in the following explanation, members that are the same as ones described and explained above are given the same reference symbols, and detailed explanation thereof will be omitted.

Figure 21:
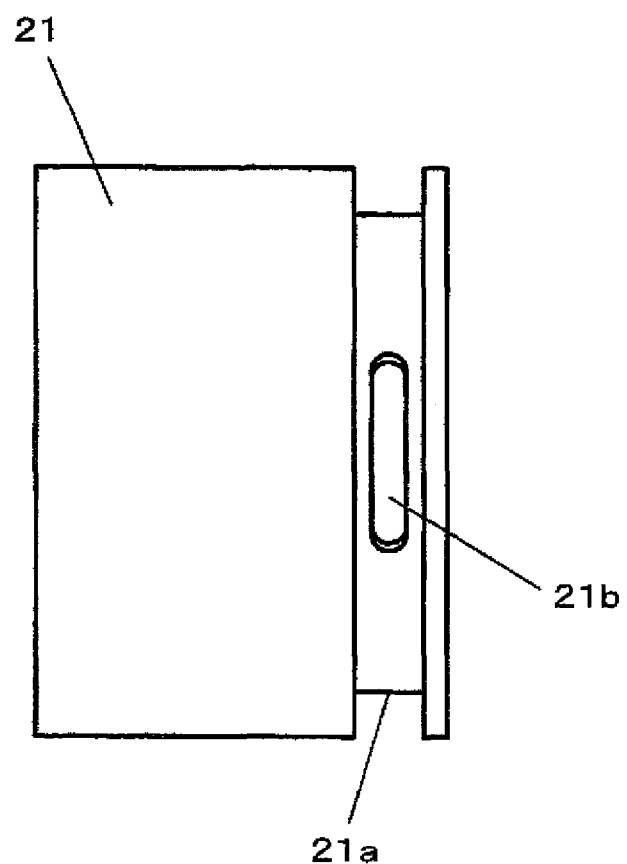
FIG. 21 is another figure showing this variant example of the embodiment of the present invention.
Figure 22C:
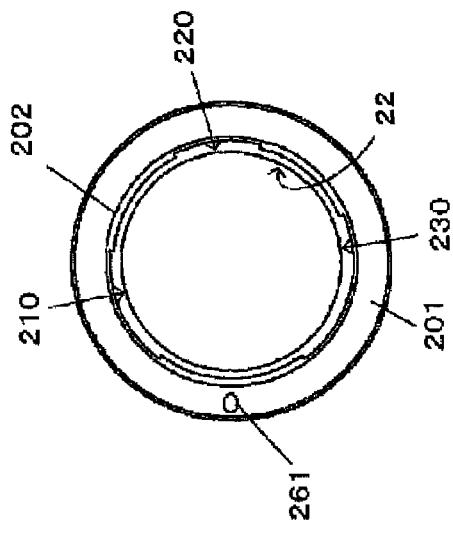
FIGS. 22A through 22D are further figures showing this variant example of the embodiment of the present invention.
Figure 22B:
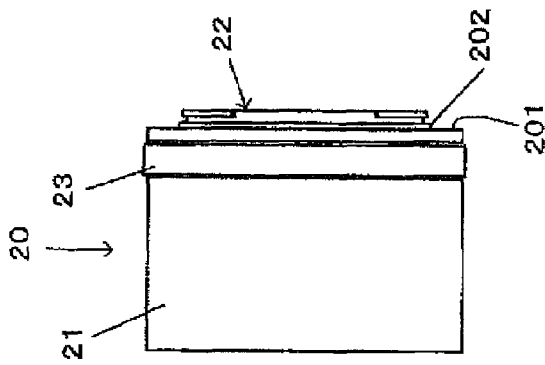
Figure 22A:
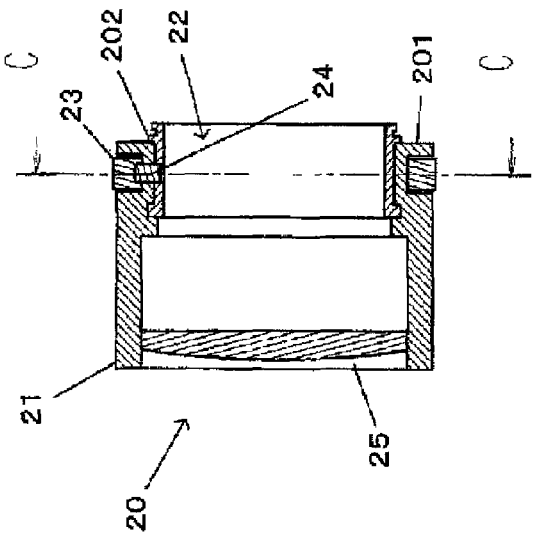
Figure 22D:
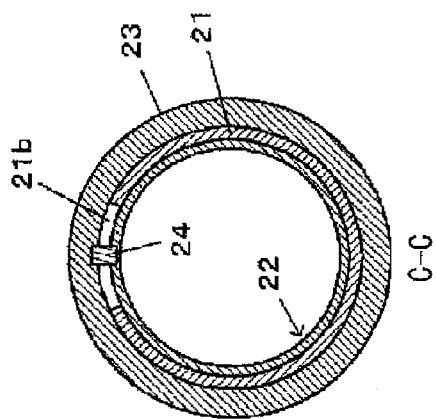

FIG. 21 is a figure showing the external appearance of the lens barrel 21, and FIGS. 22A through 22D are figures schematically showing the construction of this photographic lens 20. As shown in FIG. 21, a fitting groove 21a is provided in the rear portion of the lens barrel 21, with the actuation ring 23 being fitted into this fitting groove 21a. A slot 21b is provided in the bottom portion of the fitting groove 21a, so that it becomes possible for a pin 24 that connects the actuation ring 23 and the bayonet barrel 22 to shift along this slot. And, as shown in the sectional views of FIGS. 22A and 22D, the actuation ring 23 is fitted into the fitting groove 21a of the lens barrel 21, with the actuation ring 23 and the bayonet barrel 22 being linked by the pin 24. The reference symbol 25 denotes a lens. With the photographic lens 20 having the above structure, when the actuation ring 23 is rotated with respect to the lens barrel 21, the bayonet barrel 22, in other words the accessory side claws 210 through 230, rotates with respect to the lens barrel 21 along with the actuation ring 23. By employing a photographic lens 20 having this configuration, after the photographic lens 20 has been inserted in the proper installation and detachment rotational phase, it is possible to install the photographic lens 20 to the camera body 1 even without rotating the lens barrel 1, simply by actuating the actuation ring 23 and rotating only the bayonet barrel 22 in the installation direction. It should be understood that FIG. 22D is a sectional view of FIG. 22A taken in a plane C-C viewed from the direction of the arrows.

(2) While, in the explanation of the structure given above, it was arranged for the limit members 262 and 263 to be provided in front of the second accessory side claw 220, the present invention is not to be considered as being limited by this detail. For example, it would also be possible for the installation side limit member 262 to be provided in some position other than in front of the second accessory side claw 220, since any position will be acceptable, provided that, when an attempt is made to install the photographic lens 2 to the camera body 1 with the lens install/detach button not shown in the figures being continuously pressed, this installation side limit member 262 abuts one of the second end surfaces 112, 122, or 132 of the three body side claws 110, 120, and 130, so as to limit the rotation of the photographic lens 2 in the installation direction. In concrete terms, for example, it would be acceptable to provide the installation side limit member 262 in one of the positions shown by the broken lines in FIG. 23 and denoted by the reference symbol 262a and by the reference symbol 262c (in other words, in the position 262a in front of the first accessory side claw 210, or in the position 262c in front of the third accessory side claw 230). It should be understood that the position shown by the broken lines in FIG. 23 and denoted by the reference symbol 262b is the position of the installation side limit member 262 in the case in which it is disposed in front of the second accessory side claw 220, as in the embodiment described above.

In a similar manner, for example, it would also be possible for the detachment side limit member 263 to be provided in some position other than in front of the second accessory side claw 220, since any position will be acceptable, provided that, when the photographic lens 2 is rotated in the detachment direction in order to detach it from the camera body 1, this detachment side limit member 263 abuts one of the first end surfaces 111, 121, or 131 of the three body side claws 110, 120, and 130, so as to limit the rotation of the photographic lens 2 in the detachment direction. In concrete terms, for example, it would be acceptable to provide the detachment side limit member 263 in one of the positions shown by the broken lines in FIG. 24 and denoted by the reference symbol 263a and by the reference symbol 263c (in other words, in the position 263a in front of the first accessory side claw 210, or in the position 263c on the accessory side between the second accessory side claw 220 and the third accessory side claw 230). It should be understood that the position shown by the broken lines in FIG. 24 and denoted by the reference symbol 263b is the position of the detachment side limit member 263 in the case in which it is provided in front of the second accessory side claw 220, as in the embodiment described above.

Figure 23:
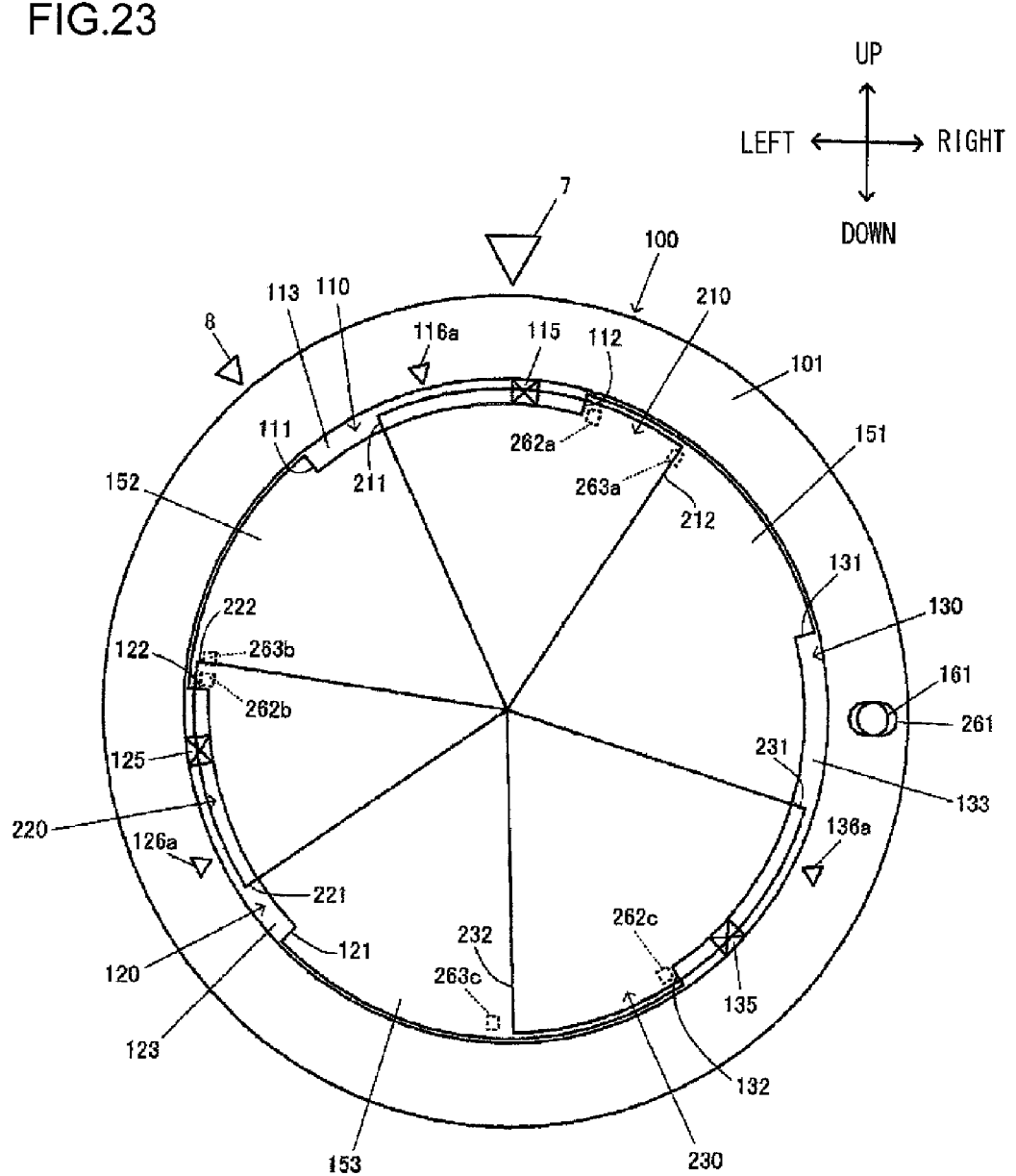
FIG. 23 is a figure showing another variant example of the embodiment of the present invention.
Figure 24:
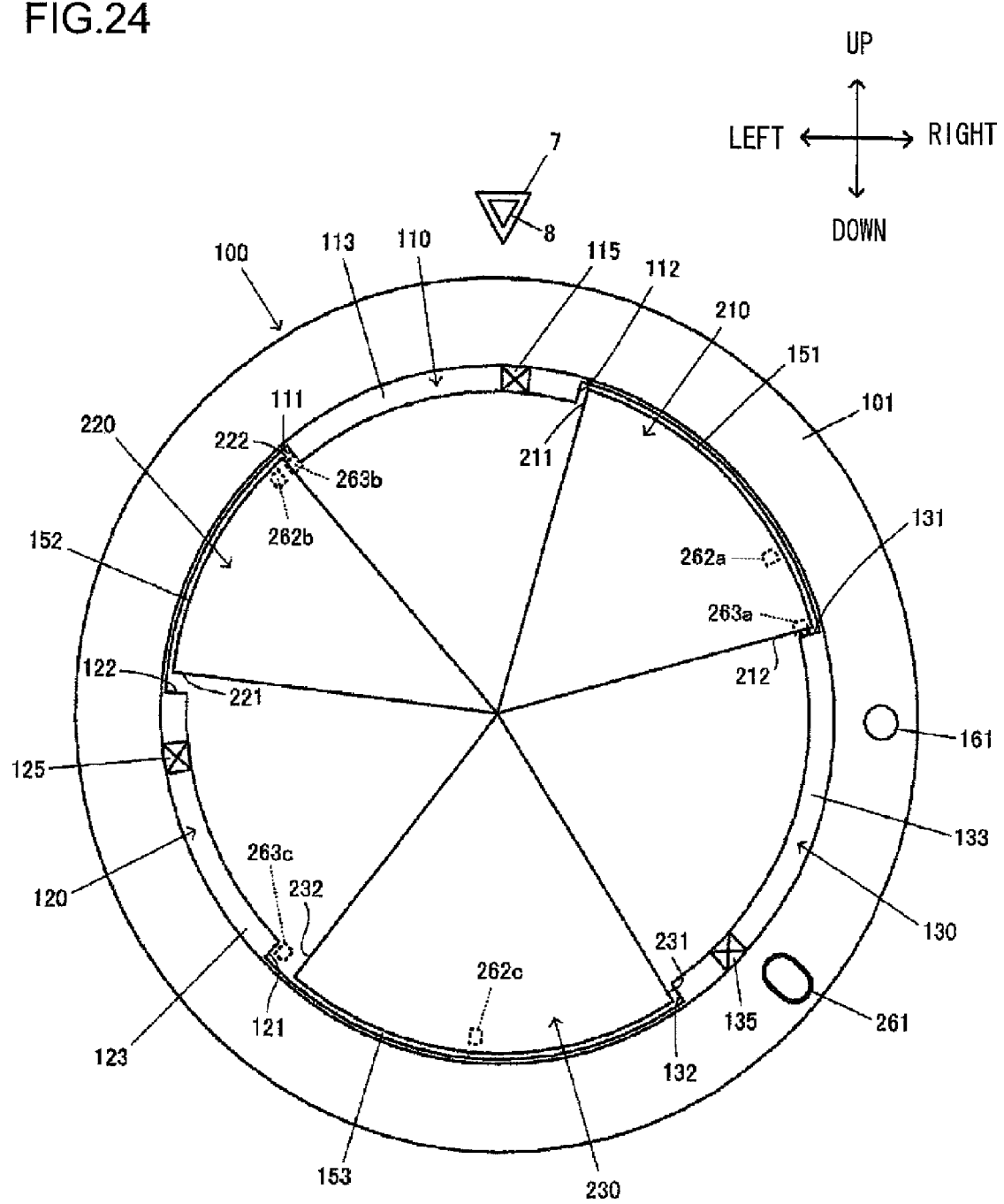
FIG. 24 is a figure showing yet another variant example of the embodiment of the present invention.

Accordingly, it will be acceptable to provide the installation side limit member 262 in at least any one of the positions shown by the broken lines and denoted by the reference symbols 262a through 262c in FIGS. 23 and 24. Moreover, it will be acceptable to provide the detachment side limit member 263 in at least any one of the positions shown by the broken lines and denoted by the reference symbols 263a through 263c in FIGS. 23 and 24. It should be understood that if, as in the explanation given above, the limit members 262 and 263 are provided in front of the second accessory side claw 220, then the limit members 262 and 263 will be arranged so as to be quite close to one another. Here, if the limit members 262 and 263 are attached by being screwed into screw holes that are provided in the accessory side mount 200, then the screw holes for attaching the limit members 262 and 263 will themselves also be quite close together. Due to this, there is a danger that some degree of difficulty may arise during processing for forming these screw holes, or that there will be some deterioration of the strength of the mounting surface, or that the task of attaching the limit members 262 and 263 may become difficult to perform, or the like. However, supposing that there is some such danger, it will be sufficient to dispose the limit members 262 and 263 so that they are not too close to one another, by making the position in which the installation side limit member 262 is disposed be one of the positions denoted by the reference symbols 262a through 262c and shown by the broken lines in FIG. 23 or FIG. 24 as appropriate, and by making the position in which the detachment side limit member 263 is disposed by one of the positions denoted by the reference symbols 263a through 263c and shown by the broken lines in FIG. 23 or FIG. 24 as appropriate.

(3) While, in the explanation of the structures given above, the photographic lenses 2 and 20 were cited as being examples of the camera accessory, the present invention is not to be considered as being limited by this feature; for example, it could be a camera accessory of any one of various types having an accessory side mount 200 that is capable of being coupled to the body side mount 100, such as a converter lens that changes the focal length, an adapter that changes the distance from a mounting surface of a photographic lens to the image capture surface, or the like.

(4) While, in the structure given above, it was arranged for the limit members 262 and 263 to be pins with heads that were attached to the accessory side mount 200, it would also be acceptable for them not to be separate members to be attached; for example, they could be made by forming the neighborhood of the second end surface 222 into shapes like the limit members 262 and 263. In other words, for example, if the accessory side mount 200 is a component that is made by injection molding of resin, then it would be acceptable to arrange to injection mold the neighborhood of the second end surface 222 into shapes like the limit members 262 and 263. Or, it would also be possible to provide a single member to the accessory side mount 200, having a portion that corresponds to the installation side end surface of the limit member 262 and a portion that corresponds to the detachment side end surface of the limit member 263. In this case, it would also be acceptable to arrange to enhance the strength of the second accessory side claw 220 by forming that member integrally with the second accessory side claw 220, upon the front surface side of the second accessory side claw 220.

(5) In the above explanation, it would also be acceptable for the body side mount 100 to be provided to the photographic lens 2, and for the accessory side mount 200 to be provided to the camera body 1.

(6) In the various embodiments described above, the camera system was explained that consisted of a camera body 1 and an interchangeable lens 2. However, the present invention should not be considered as being limited to application to a camera system. The present invention is not limited to being applied to a camera; it can be applied to any device that is provided with a mount to which an interchangeable lens 2 can be detachably fitted. For example, an electronic device such as a projector or the like may be considered as being one such device. It is possible to obtain a system like the embodiment described above by constructing the projection lens portion of a projector as an interchangeable projection lens of detachable type.

(7) The various embodiments and variant embodiments described above may also be combined with one another.

It should be understood that the present invention is not limited in any way to the embodiments described above: it includes camera accessories having constructions of various types, each of which is a camera accessory that is detachably fitted to a camera body including a camera body side mount, and that comprises an accessory side mount having a bayonet construction with first through third claws that are mutually separated around a circumferential direction along a circumference of a circle with a predetermined diameter and that project in a radial direction from the circumference, characterized in that: when the accessory side mount has been inserted into the camera body side mount in a proper installation and detachment rotational phase, each of the first through third claws is permitted to be inserted into the camera body side mount without being hampered by three camera body side claws that are provided to the camera body side mount; the accessory side mount comprises at least a first limiting portion and a second limiting portion that is different from the first limiting portion; when, in order to install the accessory side mount that has been inserted in the proper installation and detachment rotational phase into the body side mount, the first through third claws are rotated in a first rotational direction along the circumferential direction, the first limiting portion limits the range of rotation in the first rotational direction by abutting an end surface of one of the camera body side claws; and when, in order to detach the accessory side mount from the body side mount, the first through third claws are rotated in a second rotational direction along the circumferential direction that is opposite to the first rotational direction, the second limiting portion limits the range of rotation in the second rotational direction by abutting an end surface of one of the camera body side claws.

According to the embodiments described above, it is possible to enhance the durability of the limiting portion.

What is claimed is:

1. A camera accessory that is detachably fitted to a camera body including a camera body side mount, and that comprises an accessory side mount having a bayonet construction with first through third claws that are mutually separated around a circumferential direction along a circumference a circle with a predetermined diameter and that project in a radial direction from the circumference; wherein:
    when the accessory side mount has been inserted into the camera body side mount in a proper installation and detachment rotational phase, each of the first through third claws is permitted to be inserted into the camera body side mount without being hampered by three camera body side claws that are provided to the camera body side mount;
    the accessory side mount comprises at least a first limiting portion and a second limiting portion that is different from the first limiting portion;
    when the first through third claws are rotated in a first rotational direction along the circumferential direction in order to install the accessory side mount that has been inserted in the proper installation and detachment rotational phase into the body side mount, the first limiting portion limits a range of rotation in the first rotational direction by abutting an end surface of one of the camera body side claws; and
    when the first through third claws are rotated in a second rotational direction along the circumferential direction that is opposite to the first rotational direction in order to detach the accessory side mount from the body side mount, the second limiting portion limits a range of rotation in the second rotational direction by abutting an end surface of one of the camera body side claws.

2. A camera accessory according to claim 1, wherein:
the first limiting portion and the second limiting portion are provided in front of one of the first through third claws.

3. A camera accessory according to claim 1, wherein:
the first limiting portion is provided in front of one of the first through third claws; and
the second limiting portion is provided in front of any one of two claws, among the first through third claws, other than the one where the first limiting portion is provided.

* * * * *